(12) United States Patent
Kawai et al.

(10) Patent No.: US 11,447,021 B2
(45) Date of Patent: Sep. 20, 2022

(54) VEHICLE CONTROL APPARATUS, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Toshihiro Kawai, Okazaki (JP); Shinichi Inoue, Okazaki (JP); Toru Ono, Toyota (JP); Yasushi Kusaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 17/321,713

(22) Filed: May 17, 2021

(65) Prior Publication Data

US 2022/0009357 A1    Jan. 13, 2022

(30) Foreign Application Priority Data

Jul. 7, 2020 (JP) .............................. JP2020-117160

(51) Int. Cl.
*B60L 1/00* (2006.01)
*B60L 3/00* (2019.01)
(Continued)

(52) U.S. Cl.
CPC ................. *B60L 50/60* (2019.02); *B60L 1/00* (2013.01); *B60L 50/52* (2019.02); *B60L 58/12* (2019.02); *H02J 7/0048* (2020.01); *B60K 6/28* (2013.01); *B60L 2210/10* (2013.01); *B60L 2240/42* (2013.01); *B60L 2240/526* (2013.01); *B60L 2240/54* (2013.01); *B60L 2250/00* (2013.01);
(Continued)

(58) Field of Classification Search
CPC .. B60L 50/60; B60L 50/52; B60L 1/00; B60L 2210/10; B60L 2240/42; B60L 2240/52; B60L 2240/54; B60L 2250/00; H02J 7/0048
USPC ....................................................... 307/10.1
See application file for complete search history.

(56) References Cited

U.S. PATENT DOCUMENTS 8,548,660 B2 * 10/2013 Thai-Tang ............ B60W 10/08
701/400
2013/0134908 A1 * 5/2013 Sugiyama ............... B60L 50/16
320/162

FOREIGN PATENT DOCUMENTS

JP    2009-027774 A    2/2009
JP    2014-023231 A    2/2014

* cited by examiner

*Primary Examiner* — Rexford N Barnie
*Assistant Examiner* — Dru Parries
(74) *Attorney, Agent, or Firm* — Oblon, McClelland, Maier & Neustadt, L.L.P.

(57) ABSTRACT

A vehicle control apparatus mounted on a vehicle including a DC-DC converter that supplies electric power from a first battery to a second battery and an auxiliary load includes an electronic control unit configured to control an operation of the converter, determine a state of a starter switch of the vehicle, detect a user operation to the vehicle, and acquire charging status information of the second battery. The electronic control unit is configured to, when the electronic control unit detects a first operation by the user and determines that the starter switch is off, drive the converter such that the converter charges the second battery, and, when an electric power amount charged in the second battery reaches a target amount of charge set based on an amount of electric power to be consumed by the auxiliary load while the starter switch is off, stop the converter.

9 Claims, 20 Drawing Sheets

(51) Int. Cl.
  B60L 50/60 (2019.01)
  B60L 50/52 (2019.01)
  B60L 58/12 (2019.01)
  H02J 7/00 (2006.01)
  B60K 6/28 (2007.10)
(52) U.S. Cl.
  CPC ....... *B60Y 2200/91* (2013.01); *B60Y 2200/92* (2013.01)

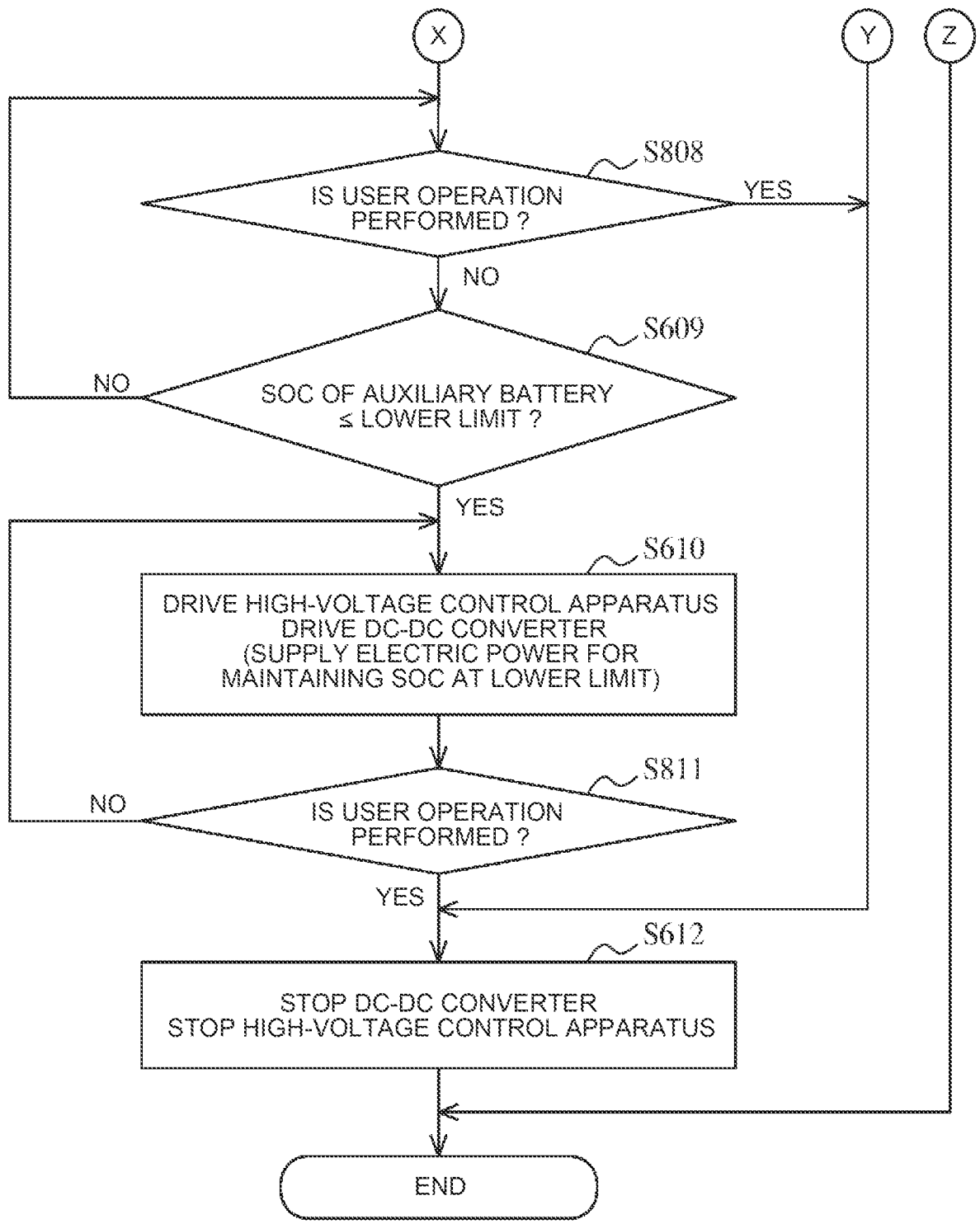

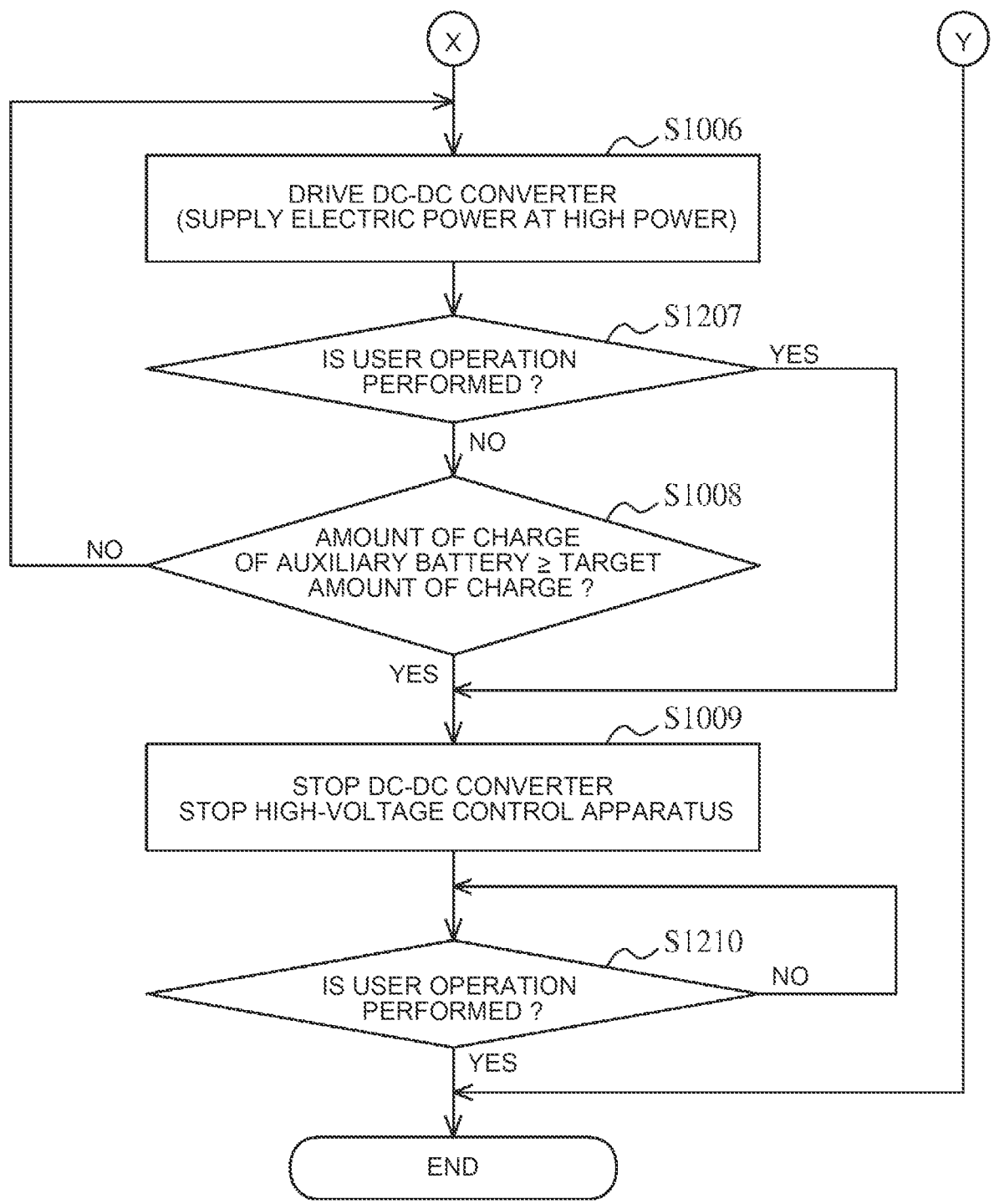

FIG. 15

| PARKING POSITION | ELAPSED TIME | | | | |
|---|---|---|---|---|---|
| | IG-OFF ↓ GET OUT OF VEHICLE | | GET INTO VEHICLE ↓ IG-ON | | |
| | MEAN VALUE | STANDARD DEVIATION | MEAN VALUE | STANDARD DEVIATION | |
| No. 1 | 20 SECONDS | 10 SECONDS | 10 SECONDS | 10 SECONDS | |
| No. 2 | 1 MINUTE | 1 MINUTE | 30 SECONDS | 1 MINUTE | |
| No. 3 | 5 MINUTES | 3 MINUTES | 1 MINUTE | 2 MINUTES | |
| ⋮ | ⋮ | ⋮ | ⋮ | ⋮ | |

VEHICLE CONTROL APPARATUS, CONTROL METHOD, NON-TRANSITORY STORAGE MEDIUM, AND VEHICLE

CROSS-REFERENCE TO RELATED APPLICATION

This application claims priority to Japanese Patent Application No. 2020-117160 filed on Jul. 7, 2020, incorporated herein by reference in its entirety.

BACKGROUND

1. Technical Field

The disclosure relates to a vehicle control apparatus, a control method, a non-transitory storage medium, and a vehicle.

2. Description of Related Art

Japanese Unexamined Patent Application Publication No. 2009-027774 (JP 2009-027774 A) and Japanese Unexamined Patent Application Publication No. 2014-023231 (JP 2014-023231 A) describe a technology for, during external charging when, for example, a vehicle is parked, improving the operational efficiency (charging efficiency and power conversion efficiency) of a DC-DC converter. The DC-DC converter charges an auxiliary battery from a high-voltage battery. The high-voltage battery supplies electric power to an in-vehicle device called a main engine such as an electric motor. The auxiliary battery supplies electric power to in-vehicle devices called auxiliaries such as an electronic mirror and occupant support devices.

In the technology described in JP 2009-027774 A, focusing on the fact that the power consumption of auxiliaries during external charging is less than the power consumption during vehicle driving, the DC-DC converter is continuously operated (driven) during vehicle driving when the power consumption of the auxiliaries is large, and the DC-DC converter is intermittently operated (driven and stopped) during external charging when the power consumption of the auxiliaries is small.

In the technology described in JP 2014-023231 A, during external charging, the DC-DC converter is intermittently operated such that the power conversion efficiency of the DC-DC converter, calculated based on the state (current, SOC, and temperature) of the auxiliary battery and the power consumption of the auxiliaries, falls within a predetermined range between an upper limit and a lower limit.

SUMMARY

For a vehicle of which the number of electronic devices mounted tends to increase, the operation of a DC-DC converter related to charging control for an auxiliary battery is important. Therefore, further improvement of the technology is expected to enhance the operational efficiency (charging efficiency and power conversion efficiency) of a DC-DC converter.

The disclosure provides a vehicle control apparatus, a control method, a non-transitory storage medium, and a vehicle, capable of enhancing the operational efficiency of a DC-DC converter in a state where a starter switch of a vehicle is off and it is estimated that a user is in the vehicle.

A first aspect of the disclosure relates to a vehicle control apparatus mounted on a vehicle including a DC-DC converter that supplies electric power from a first battery related to driving of the vehicle to a second battery, different from the first battery, and an auxiliary load that uses the second battery as a power supply. The vehicle control apparatus includes an electronic control unit. The electronic control unit is configured to control an operation of the DC-DC converter, determine a state of a starter switch of the vehicle, detect an operation of a user to the vehicle, and acquire information on a charging status of the second battery. The electronic control unit is configured to, when the electronic control unit detects a first operation by the user and determines that the starter switch is off, drive the DC-DC converter such that the DC-DC converter charges the second battery. The electronic control unit is configured to, when an amount of electric power charged in the second battery, which is included in the acquired information on the charging status of the second battery, reaches a target amount of charge set based on an amount of electric power to be consumed by the auxiliary load while the starter switch is off, stop the DC-DC converter.

In the vehicle control apparatus, the amount of electric power to be consumed by the auxiliary load may be set based on an electric power to be consumed by the auxiliary load while the starter switch is off and an elapsed time from when the first operation is detected to when a second operation by the user is estimated to be detected.

In the vehicle control apparatus, the elapsed time may be stored in advance in association with information about a position of the vehicle where the starter switch is turned off.

In the vehicle control apparatus, the electronic control unit may be configured to, when a state of charge of the second battery, which is included in the acquired information on the charging status of the second battery, becomes lower than or equal to a first threshold after the DC-DC converter is stopped, drive the DC-DC converter again such that the DC-DC converter supplies electric power to the auxiliary load.

In the vehicle control apparatus, the electronic control unit may be configured to drive the DC-DC converter again such that the DC-DC converter supplies electric power to the auxiliary load while maintaining the state of charge of the second battery at the first threshold.

In the vehicle control apparatus, the electronic control unit may be configured to, when the electronic control unit detects the first operation by the user and determines that the starter switch is off, drive the DC-DC converter such that, after the state of charge of the second battery, which is included in the acquired information on the charging status of the second battery, decreases to a second threshold, the DC-DC converter charges the second battery.

In the vehicle control apparatus, the electronic control unit may be configured to, when the electronic control unit detects a third operation by the user, stop the DC-DC converter even when the amount of electric power charged in the second battery has not reached the target amount of charge.

In the vehicle control apparatus, the electronic control unit may be configured to, when the electronic control unit stops the DC-DC converter, also stop a device that controls supply of electric power to the first battery and that uses the second battery as a power supply.

A second aspect of the disclosure relates to a vehicle including the above-described vehicle control apparatus.

A third aspect of the disclosure relates to a control method that is executed by a computer of a vehicle control apparatus mounted on a vehicle including a DC-DC converter that supplies electric power from a first battery related to driving of the vehicle to a second battery, different from the first battery, and an auxiliary load that uses the second battery as a power supply. A fourth aspect of the disclosure relates to a non-transitory storage medium storing instructions executable on one or plurality of processors and causing the one or plurality of processors to execute functions, included in a vehicle control apparatus mounted on a vehicle including a DC-DC converter that supplies electric power from a first battery related to driving of the vehicle to a second battery, different from the first battery, and an auxiliary load that uses the second battery as a power supply. The control method or the functions include determining a state of a starter switch of the vehicle; detecting an operation of a user to the vehicle; acquiring information on a charging status of the second battery; when a first operation by the user is detected and it is determined that the starter switch is off, driving the DC-DC converter such that the DC-DC converter charges the second battery; and, when an amount of electric power charged in the second battery, which is included in the acquired information on the charging status of the second battery, reaches a target amount of charge set based on an amount of electric power to be consumed by the auxiliary load while the starter switch is off, stopping the DC-DC converter.

With the vehicle control apparatus, control method, non-transitory storage medium, and vehicle according to the disclosure, charging of the second battery in a state where the starter switch of the vehicle is off and it is estimated that the user is in the vehicle is controlled based on the amount of power consumption of the auxiliary load in that state. Therefore, it is possible to enhance the operational efficiency of the DC-DC converter.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8B is a flowchart showing an example of the procedure when a user gets into the vehicle based on second control;

FIG. 12B is a flowchart showing an example of the procedure when a user gets into the vehicle based on third control;

FIG. 15 is a table showing an example of position-time information stored in a storage unit.

DETAILED DESCRIPTION OF EMBODIMENTS

When a vehicle control apparatus according to the disclosure determines that an ignition of a vehicle is off and it is estimated that a user is in the vehicle, the vehicle control apparatus charges an auxiliary battery from a high-voltage battery until the amount of charge reaches a target amount of charge set based on past charging conditions (power consumption and time) for an auxiliary load in this state. Thus, the operational efficiency of a DC-DC converter is enhanced. Hereinafter, embodiments of the disclosure will be described in detail with reference to the accompanying drawings.

First Embodiment

Configuration

Figure 1:
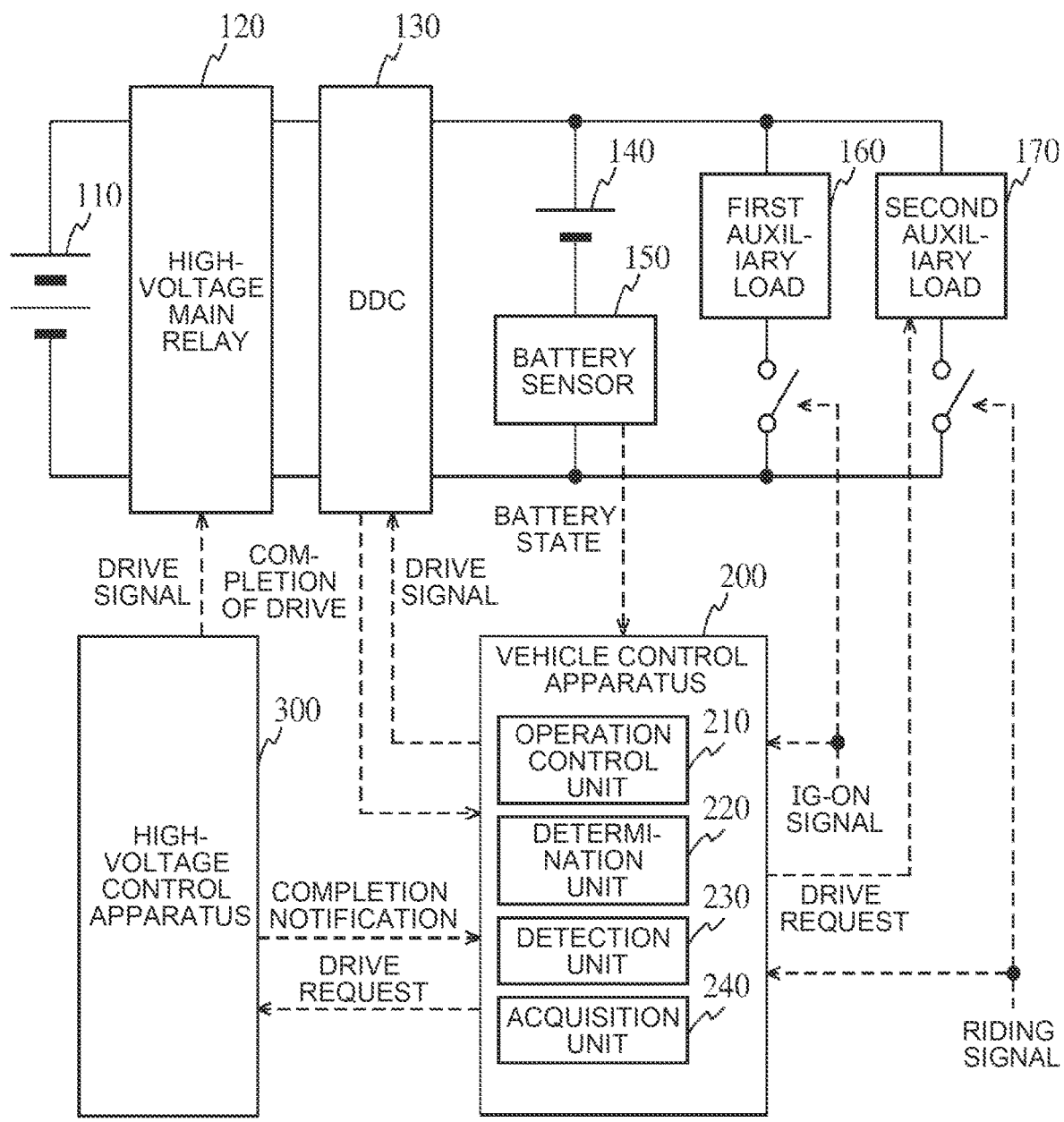
FIG. 1 is a functional block diagram of a vehicle control apparatus and its peripheral components according to a first embodiment.

FIG. 1 is a functional block diagram of a vehicle control apparatus 200 and its peripheral components according to a first embodiment of the disclosure. The functional blocks illustrated in FIG. 1 include a high-voltage battery 110, a high-voltage main relay 120, a DC-DC converter (DDC) 130, an auxiliary battery 140, a battery sensor 150, a first auxiliary load 160, a second auxiliary load 170, a vehicle control apparatus 200, and a high-voltage control apparatus 300. In FIG. 1, signal lines for electric power are represented by continuous lines, and signal lines for control and communication are represented by dashed lines.

The high-voltage battery 110 is a secondary battery, such as a lithium ion battery, configured to be chargeable and dischargeable. The high-voltage battery 110 is a battery (first battery) related to driving of a vehicle and supplies electric power to a high-voltage system including a so-called main engine (not shown) mounted on the vehicle, for example, a driving electric motor or the like. The high-voltage battery 110 is connected to the DC-DC converter 130 via the high-voltage main relay 120 of which the connected/cut-off state is switched by the control of the high-voltage control apparatus 300. When the high-voltage main relay 120 is connected, the high-voltage battery 110 is capable of supplying electric power to the DC-DC converter 130.

The DC-DC converter 130 connects the high-voltage battery 110 to the auxiliary battery 140, the first auxiliary load 160, and the second auxiliary load 170 via the high-voltage main relay 120. The DC-DC converter 130 is capable of supplying electric power stored in the high-voltage battery 110 to the auxiliary battery 140, the first auxiliary load 160, and the second auxiliary load 170 based on control of the vehicle control apparatus 200. When electric power is supplied, the DC-DC converter 130 is capable of converting (stepping down) the high voltage of the high-voltage battery 110, which is an input voltage, to a predetermined low voltage regulated for the auxiliary battery 140 and output the low voltage in accordance with a voltage command value from the vehicle control apparatus 200.

The auxiliary battery 140 is a secondary battery configured to be chargeable and dischargeable, such as a lead-acid battery and a lithium ion battery. The auxiliary battery 140 is a battery (second battery) that serves as a power supply to supply electric power to an auxiliary system including the first auxiliary load 160 and the second auxiliary load 170. Generally, the auxiliary battery 140 is set to a rated voltage lower than that of the high-voltage battery 110. The state of the auxiliary battery 140 is monitored by the battery sensor 150. The battery sensor 150 of the present embodiment includes at least a current sensor that detects a current flowing into the auxiliary battery 140 and a current flowing out from the auxiliary battery 140, and a voltage sensor that detects the terminal voltage of the auxiliary battery 140. The battery state (current value and voltage value) detected by the battery sensor 150 is output to the vehicle control apparatus 200 as needed.

The first auxiliary load 160 and the second auxiliary load 170 are so-called auxiliaries, such as an electronic mirror and occupant support devices, mounted on the vehicle, and are loads that consume electric power required to perform predetermined operations. The first auxiliary load 160 and the second auxiliary load 170 operate on electric power supplied from the DC-DC converter 130 or electric power stored in the auxiliary battery 140.

In the present embodiment, the first auxiliary load 160 is an auxiliary load that operates when the ignition that is a starter switch of the vehicle is on (when an IG-ON signal is input). The second auxiliary load 170 is an auxiliary load that operates when it is estimated that a person, such as a driver and a passenger, (hereinafter, referred to as user) is in the vehicle (when a riding signal is input) not only when the ignition is on but also when the ignition is off. The operation of the second auxiliary load 170 can be performed based on a drive request received from the vehicle control apparatus 200.

FIG. 1 shows an example in which the first auxiliary load 160 and the second auxiliary load 170 are mounted on the vehicle one by one. Two or more of the first auxiliary loads 160 may be mounted on the vehicle, and two or more of the second auxiliary loads 170 may be mounted on the vehicle.

The vehicle control apparatus 200 is capable of managing the power of the vehicle using the high-voltage battery 110 and the auxiliary battery 140 based on the on/off state of the ignition of the vehicle. In a state where the ignition is on, electric power is supplied from the high-voltage battery 110 to the high-voltage system including the main engine (not shown) related to driving of the vehicle, such as the driving electric motor, while the high-voltage main relay 120 is connected and the DC-DC converter 130 is driven to supply electric power from the high-voltage battery 110 to the auxiliary battery 140. In a state where the ignition is off, at least electric power is not supplied from the high-voltage battery 110 to the high-voltage system. The vehicle control apparatus 200 of the present embodiment particularly suitably controls the DC-DC converter 130 in a state where the ignition of the vehicle is off and executes control for enhancing the operational efficiency of the DC-DC converter 130. The vehicle control apparatus 200 includes an operation control unit 210, a determination unit 220, a detection unit 230, and an acquisition unit 240.

The operation control unit 210 is a component for controlling the operation of the DC-DC converter 130. Specifically, the operation control unit 210 outputs, to the DC-DC converter 130, a drive signal including a voltage command value indicating an output voltage value of the DC-DC converter 130. The DC-DC converter 130 driven in response to the input drive signal provides the operation control unit 210 with a notification that the drive based on the voltage command value is complete. The operation control unit 210 is capable of making a request to the high-voltage control apparatus 300 to be driven or stopped.

The determination unit 220 is a component for determining whether the ignition of the vehicle is off. This determination is typically performed based on whether the IG-ON signal that is output when the ignition is on is input to the vehicle control apparatus 200. The determination unit 220 may determine that the ignition is off with a method other than checking the IG-ON signal.

The detection unit 230 is a component for detecting an operation of a user to the vehicle. This detection is typically performed based on whether a riding signal that is generated in response to a specific operation based on which it is estimated that a user is in the vehicle (riding) is input to the vehicle control apparatus 200. Examples of the specific operation include a series of door operations that a vehicle door is opened and then closed and a vehicle door lock/unlock operation. The detection unit 230 may detect that a user is in the vehicle with a method (a seat sensor, a driver's camera, or the like) other than checking a riding signal based on the specific operation.

The acquisition unit 240 is a component for acquiring information on the charging status of the auxiliary battery 140. Specifically, the acquisition unit 240 acquires the amount of charge by which the auxiliary battery 140 is charged, based on the battery state (current value and voltage value) input from the auxiliary battery 140. The amount of charge to be acquired will be described later.

The vehicle control apparatus 200 can be typically made up of all or part of an electronic control unit (ECU) including a processor, a memory, and an input/output interface. The electronic control unit includes an ECU capable of controlling the connected/cut-off state of the high-voltage main relay 120, an ECU capable of controlling the output voltage value of the DC-DC converter 130, an ECU capable of monitoring the state of the auxiliary battery 140, and the like. The vehicle control apparatus 200 implements the above-described functions by the processor reading and executing a program stored in the memory.

The high-voltage control apparatus 300 controls the switching of the high-voltage main relay 120 between the connected state and the cut-off state. This switching is performed based on whether to output a drive signal for setting the connected state to the high-voltage main relay 120. The high-voltage control apparatus 300 is capable of controlling the apparatus itself to be driven or stopped based on a request from the vehicle control apparatus 200. A notification about completion of drive/stop control based on the request is provided from the high-voltage control apparatus 300 to the vehicle control apparatus 200.

Control

Control to be executed by the vehicle control apparatus 200 according to the first embodiment of the disclosure will be described with further reference to FIG. 2 to FIG. 13.

(1) First Control

Figure 2:
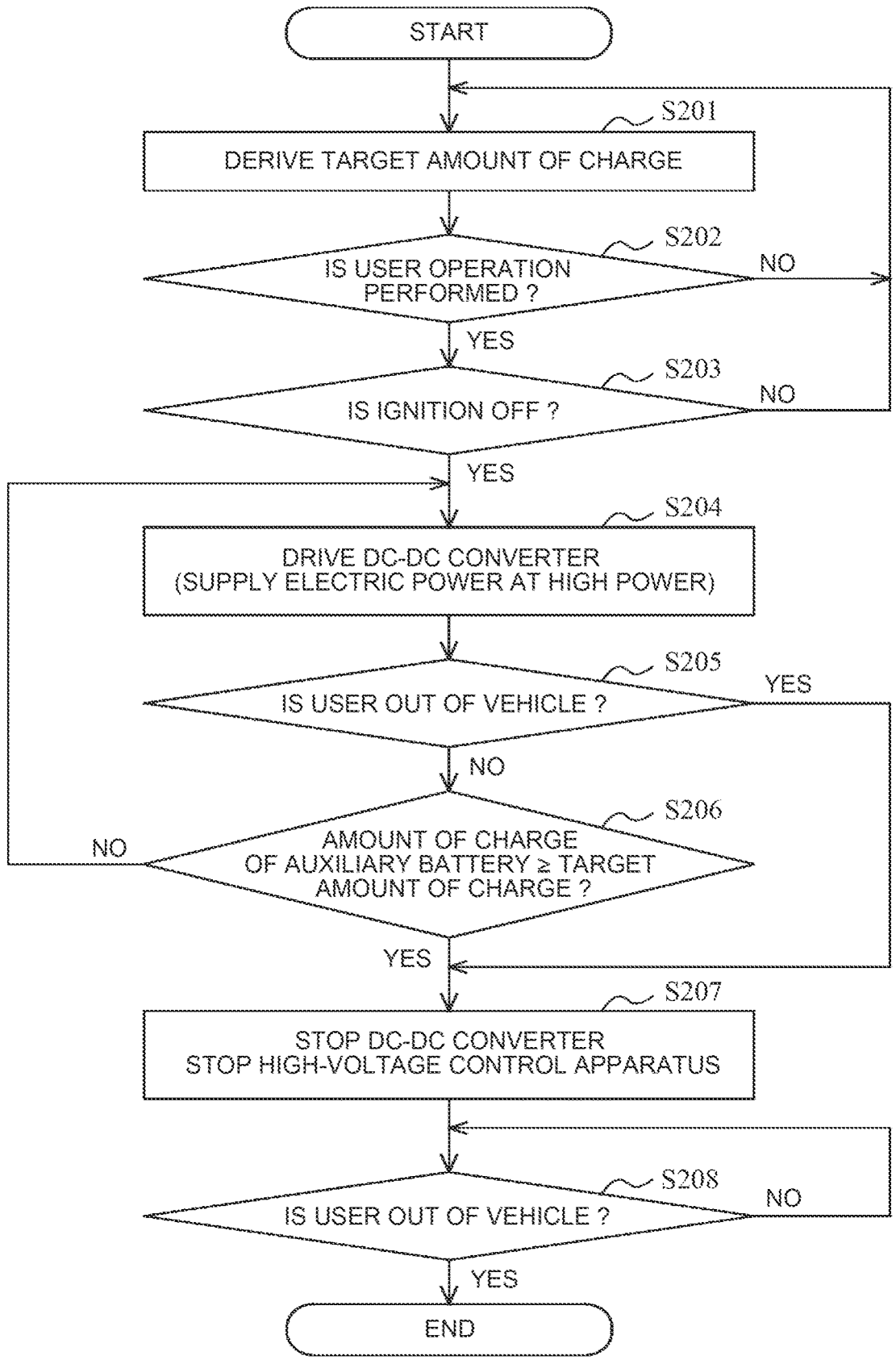
FIG. 2 is a flowchart showing an example of a procedure when a user gets out of a vehicle based on first control.
Figure 3:
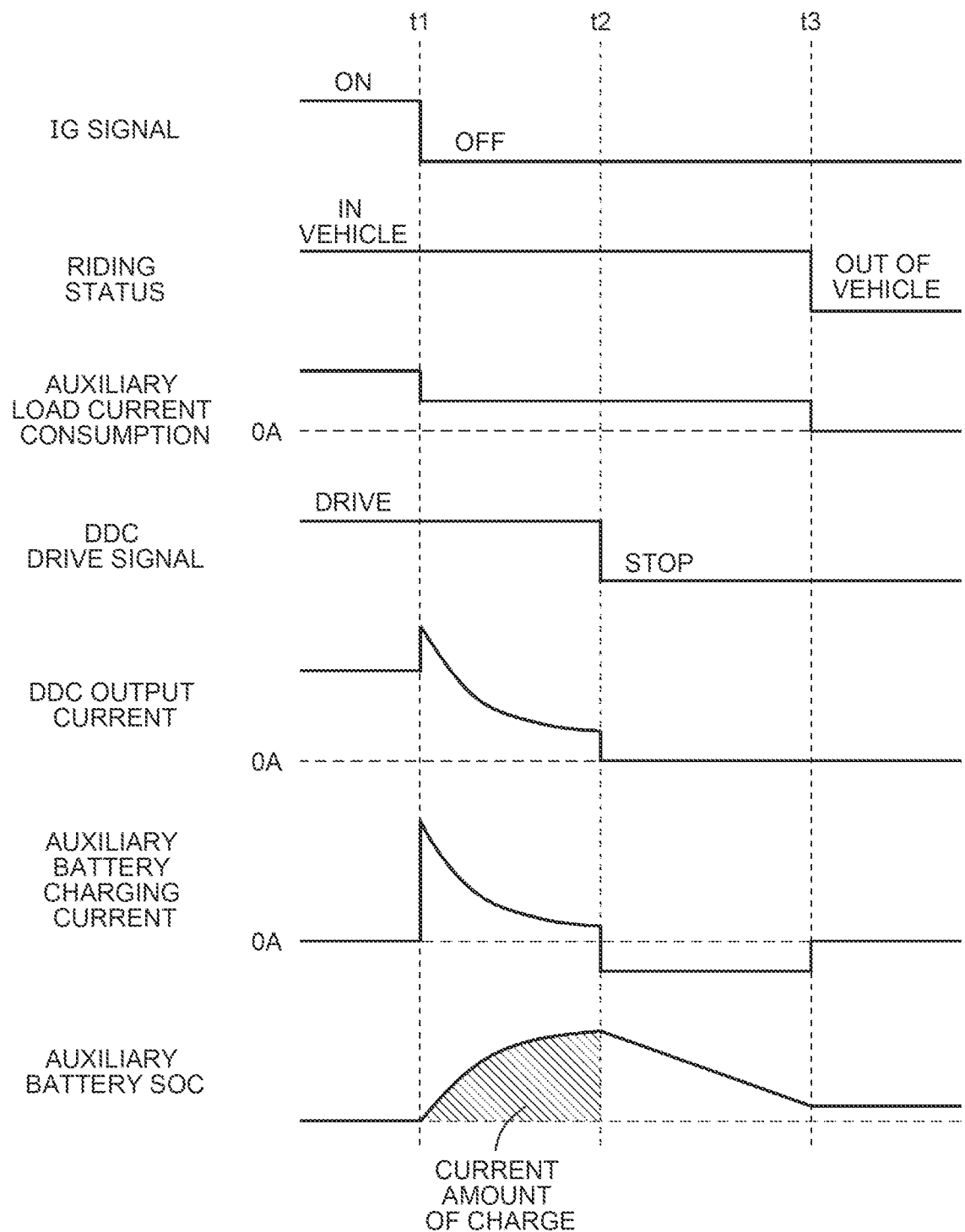
FIG. 3 is a timing chart showing an example of the operation timing when a user gets out of the vehicle based on first control.

FIG. 2 is a flowchart showing a procedure of first control to be executed by the components of the vehicle control apparatus 200. FIG. 3 is a timing chart showing an example of the operation timing of the components based on first control. An example shown in FIG. 2 and FIG. 3 is an example when a user gets out of the vehicle and describes control in a situation in which the ignition of the vehicle is switched from the on state to the off state, then the vehicle door is opened and closed, and then the vehicle door is locked.

Step S201

The acquisition unit 240 sets a target amount of charge of the auxiliary battery 140. The target amount of charge is derived based on, in a state where the ignition of the vehicle is off and it is estimated that the user is in the vehicle, an electric power (load power consumption) consumed by the second auxiliary load 170 in that state and the duration (riding time) of that state. The target amount of charge may be a fixed value given in advance to the vehicle or may be a learning value that changes each time according to the usage of the vehicle. Both the fixed value and learning value of the target amount of charge may be used so as to be switchable.

A specific example of a learned target amount of charge will be described. A load power consumption can be obtained by integrating the current value and voltage value of the auxiliary battery 140, input from the battery sensor 150. A riding time can be counted with a timer (not shown) in the vehicle control apparatus 200 based on a determined result of the determination unit 220 and a detected result of the detection unit 230. The riding time is typically an elapsed time from when a user operation (first operation) (described later) is detected to when an operation (second operation or third operation) based on which it is estimated that the user is out of the vehicle is detected. The acquisition unit 240 may, for example, set a target amount of charge to the amount of charge obtained from a time integral of load power consumption and riding time, measured in the past. Alternatively, the acquisition unit 240 may set a target amount of charge to a mean value, maximum value, or the like, of a plurality of amounts of charge obtained from a plurality of measured values in the past. Alternatively, the acquisition unit 240 may set, for example, a target amount of charge to the amount of charge that covers 90% of past examples based on a deviation in consideration of variations of a plurality of amounts of charge obtained from a plurality of measured values in the past. The timing to set a target amount of charge is not limited and may be set while the ignition of the vehicle is on. The set target amount of charge is held in the vehicle control apparatus 200. When the target amount of charge of the auxiliary battery 140 is set, the process proceeds to step S202.

Step S202

The detection unit 230 determines whether the user operation (first operation) that can be performed by the user in the vehicle is detected. In this example when the user gets out of the vehicle, an operation to depress an ignition switch button in order to switch the ignition from the on state to the off state corresponds to the user operation. When the user operation is detected (YES in step S202), it is estimated that the user is still in the vehicle, and the process proceeds to step S203; otherwise (NO in step S202), the process proceeds to step S201.

Step S203

The determination unit 220 determines whether the ignition of the vehicle is off based on the IG-ON signal. In this example when the user gets out of the vehicle, when the user operation (first operation) is performed, the ignition turns off. When the ignition is off (YES in step S203), the process proceeds to step S204; otherwise (NO in step S203), the process proceeds to step S201.

Step S204

The operation control unit 210 drives the DC-DC converter 130. Specifically, the operation control unit 210 outputs a drive signal having a set voltage command value at which current can be supplied to the auxiliary battery 140 at high power, to the DC-DC converter 130 (t1 in FIG. 3: DDC drive signal, DDC output current). Through this control, current is supplied from the high-voltage battery 110 to the auxiliary battery 140 (t1 in FIG. 3: auxiliary battery charging current), and the auxiliary battery 140 is charged (t1 in FIG. 3: auxiliary battery SOC). When the DC-DC converter 130 is driven, the process proceeds to step S205.

Step S205

The detection unit 230 determines whether an operation (third operation) based on which it is estimated that the user is out of the vehicle is detected. For example, it may be estimated that the user is out of the vehicle when a series of door operations that the vehicle door is opened and then closed is detected, or it may be estimated that the user is out of the vehicle when, in addition to the door operations, locking the vehicle door is detected. When it is not estimated that the user is out of the vehicle (NO in step S205), the process proceeds to step S206; whereas, when it is estimated that the user is out of the vehicle (YES in step S205), the process proceeds to step S207. When the user is out of the vehicle (t3 in FIG. 3: riding status), the current consumption of the auxiliary battery 140 by the second auxiliary load 170 disappears (t3 in FIG. 3: auxiliary load current consumption, auxiliary battery charging current), and the state of charge (SOC) of the auxiliary battery 140 also does not decrease (t3 in FIG. 3: auxiliary battery SOC).

Step S206

The acquisition unit 240 determines whether the current amount of charge of the auxiliary battery 140 (the shaded area of the auxiliary battery SOC in FIG. 3), obtained by evaluating a time integral of the current value and voltage value of the auxiliary battery 140, input from the battery sensor 150, is greater than or equal to the target amount of charge of the auxiliary battery 140. When the current amount of charge is greater than or equal to the target amount of charge (YES in step S206), the process proceeds to step S207; otherwise (NO in step S206), the process proceeds to step S204.

Step S207

The operation control unit 210 stops the DC-DC converter 130. Specifically, the operation control unit 210 outputs a drive signal having a set voltage command value indicating that no electric power is supplied to the auxiliary battery 140, to the DC-DC converter 130 (t2 in FIG. 3: DDC drive signal). Through this control, no current is supplied from the high-voltage battery 110 to the auxiliary battery 140 (t2 in FIG. 3: DDC output current), and charging of the auxiliary battery 140 is stopped (t2 in FIG. 3: auxiliary battery charging current). After charging of the auxiliary battery 140 is stopped, the current consumption of the auxiliary battery 140 by the second auxiliary load 170 proceeds, and the state of charge of the auxiliary battery 140 decreases (t2 to t3 in FIG. 3: auxiliary battery SOC). The operation control unit 210 makes a request to the high-voltage control apparatus 300 to stop its operation. Thus, the high-voltage main relay 120 is cut off, and the operation of the high-voltage control apparatus 300 stops. The process to stop the operation of the high-voltage control apparatus 300 does not need to be executed when, for example, the influence of electric power to be consumed by the high-voltage control apparatus 300 on power management of the vehicle is small. When the DC-DC converter 130 is stopped and the operation of the high-voltage control apparatus 300 is stopped, the process proceeds to step S208.

Step S208

The detection unit 230 determines whether an operation (second operation) based on which it is estimated that the user is out of the vehicle is detected. For example, it may be estimated that the user is out of the vehicle when a series of door operations that the vehicle door is opened and then closed is detected, or it may be estimated that the user is out of the vehicle when, in addition to the door operations, locking the vehicle door is detected. When it is not estimated that the user is out of the vehicle (NO in step S208), the process repeats the determination of step S208; whereas, when it is estimated that the user is out of the vehicle (YES in step S208), the first control ends.

Figure 4:
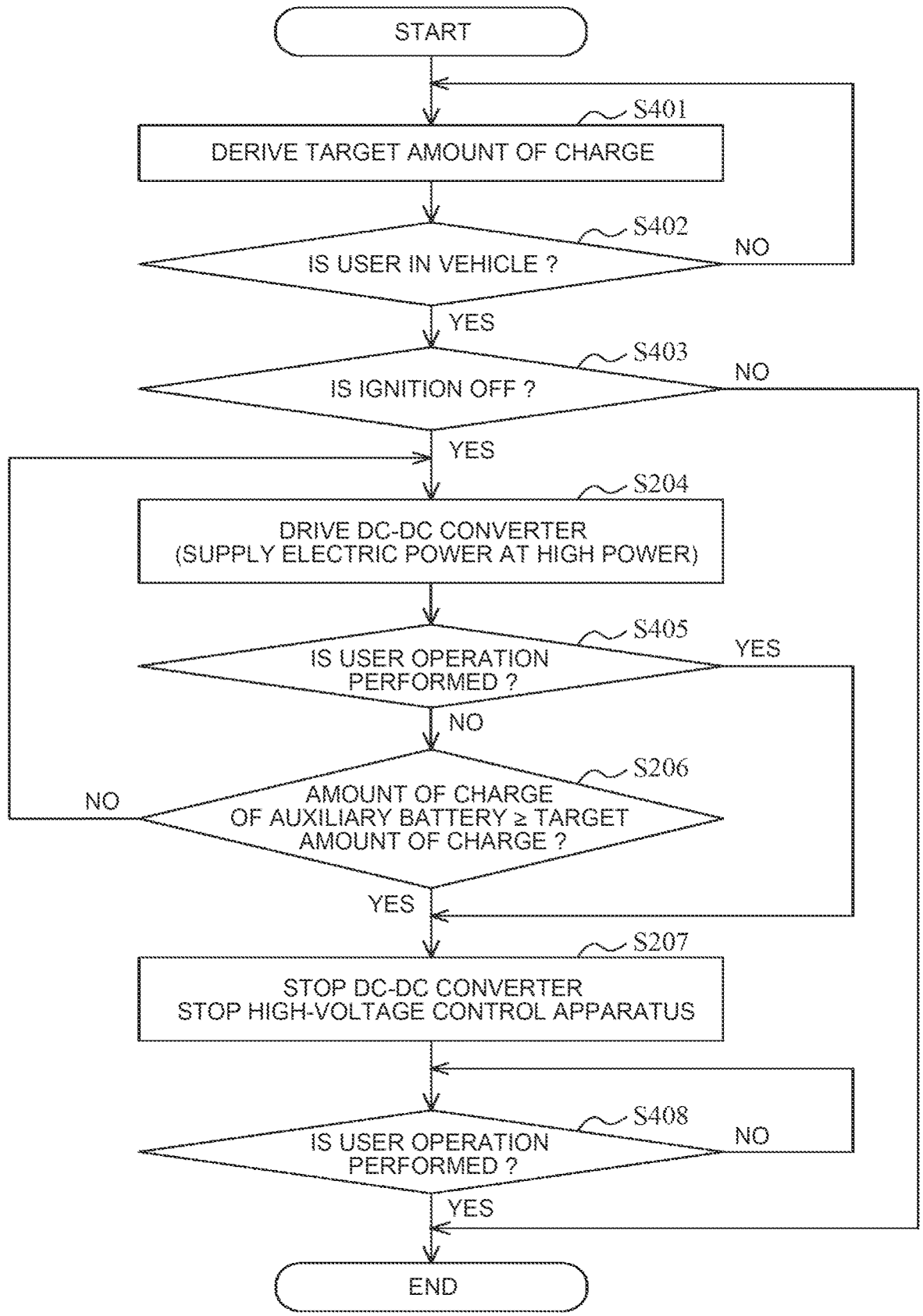
FIG. 4 is a flowchart showing an example of a procedure when a user gets into the vehicle based on first control.

In this way, in first control, in a state where the ignition of the vehicle is off when the user gets out of the vehicle and it is estimated that the user is in the vehicle, the auxiliary battery 140 is charged from the high-voltage battery 110 until the amount of charge reaches the target amount of charge (t1 to t2 in FIG. 4). The target amount of charge is set based on an estimated electric power to be consumed by the second auxiliary load 170 in a period from when the ignition is turned off to when the user completes getting out of the vehicle. Therefore, it is possible to enhance the operational efficiency of the DC-DC converter 130 by continuously charging the auxiliary battery 140 up to the target amount of charge.

Figure 5:
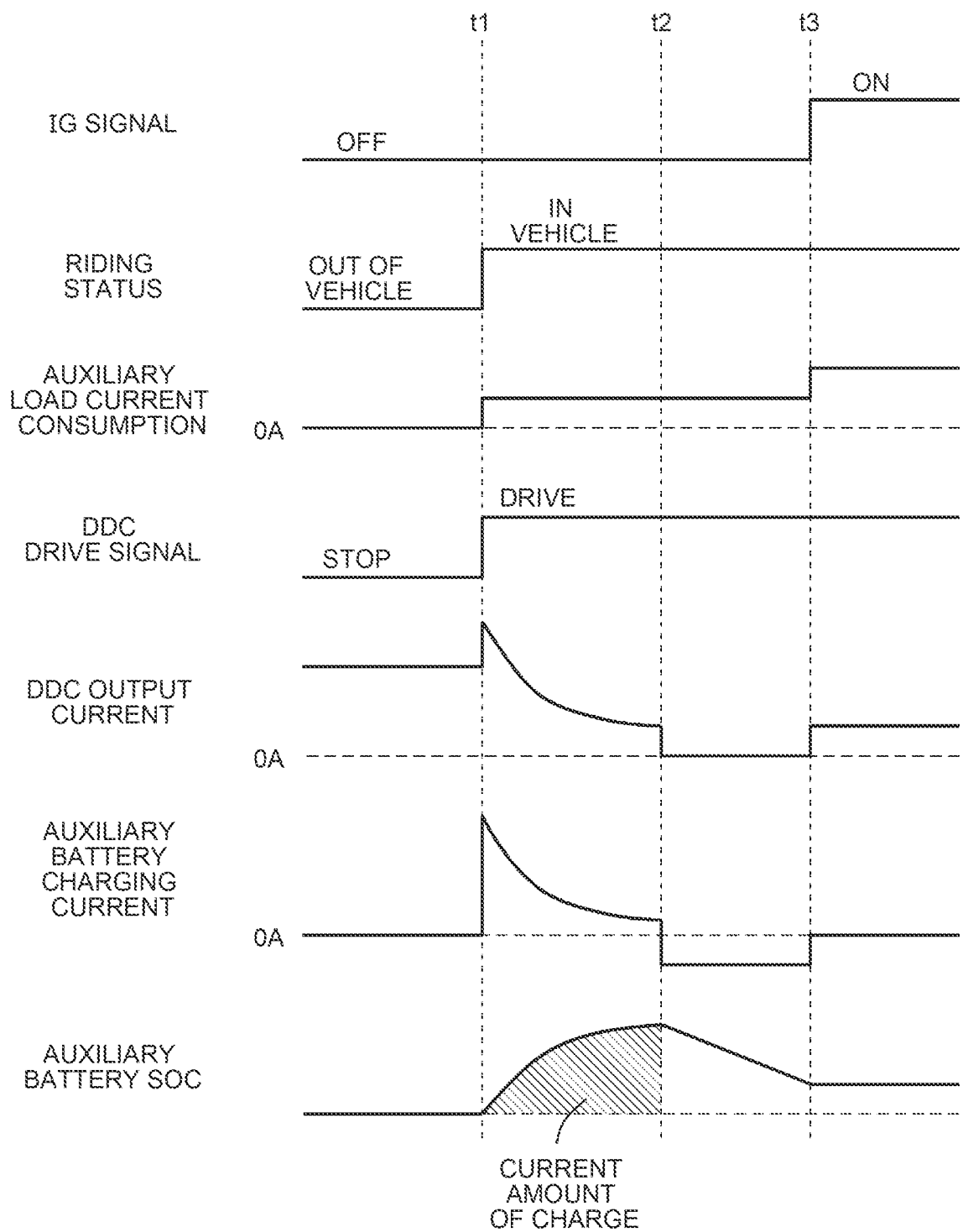
FIG. 5 is a timing chart showing an example of the operation timing when a user gets into the vehicle based on first control.

FIG. 4 and FIG. 5 are an example of first control when a user gets into the vehicle and illustrate control in which the vehicle door is unlocked when the ignition of the vehicle is off, then the vehicle door is opened and closed, and then the ignition is turned on.

The process flowchart when a user gets into the vehicle (FIG. 4) differs from the process flowchart when a user gets out of the vehicle (FIG. 2) in the processes of step S401, step S402, step S403, step S405, and step S408.

In step S401 of FIG. 4, a riding time for setting a target amount of charge is an elapsed time from when an operation (first operation) based on which it is estimated that a user is in the vehicle (described later) is detected to when a user operation (second operation or third operation) that is performed after the user gets into the vehicle is detected. In step S402 of FIG. 4, the detection unit 230 determines whether the operation (first operation) based on which it is estimated that the user is in the vehicle is detected. When, for example, a series of door operations that the vehicle door is unlocked, then the vehicle door is opened, and then closed is detected, it is estimated that the user is in the vehicle. Alternatively, when only the vehicle door is unlocked, it may be estimated that the user is in the vehicle. In step S403 of FIG. 4, the detection unit 230 determines whether the ignition of the vehicle is off. When it is determined in step S403 that the ignition is not off, the first control ends. In step S405 and step S408 of FIG. 4, the detection unit 230 determines whether the user operation (second operation or third operation) performed by the user after the user gets into the vehicle is detected. In this example when the user gets into the vehicle, an operation to depress the ignition switch button in order to switch the ignition from the off state to the on state corresponds to the user operation.

In this way, in first control, when the user gets into the vehicle, as in the case of the above-described example when the user gets out of the vehicle, in a state where the ignition of the vehicle is off and it is estimated that the user is in the vehicle, the auxiliary battery 140 is charged from the high-voltage battery 110 until the amount of charge reaches the target amount of charge (t1 to t2 in FIG. 5). When the target amount of charge is set based on an estimated electric power to be consumed by the second auxiliary load 170 in a period from when the user gets into the vehicle to when the ignition turns on, it is possible to enhance the operational efficiency of the DC-DC converter 130 by continuously charging the auxiliary battery 140 up to the target amount of charge. After the ignition is turned on, normal power control is performed (t3 in FIG. 5).

(2) Second Control

Figure 6A:
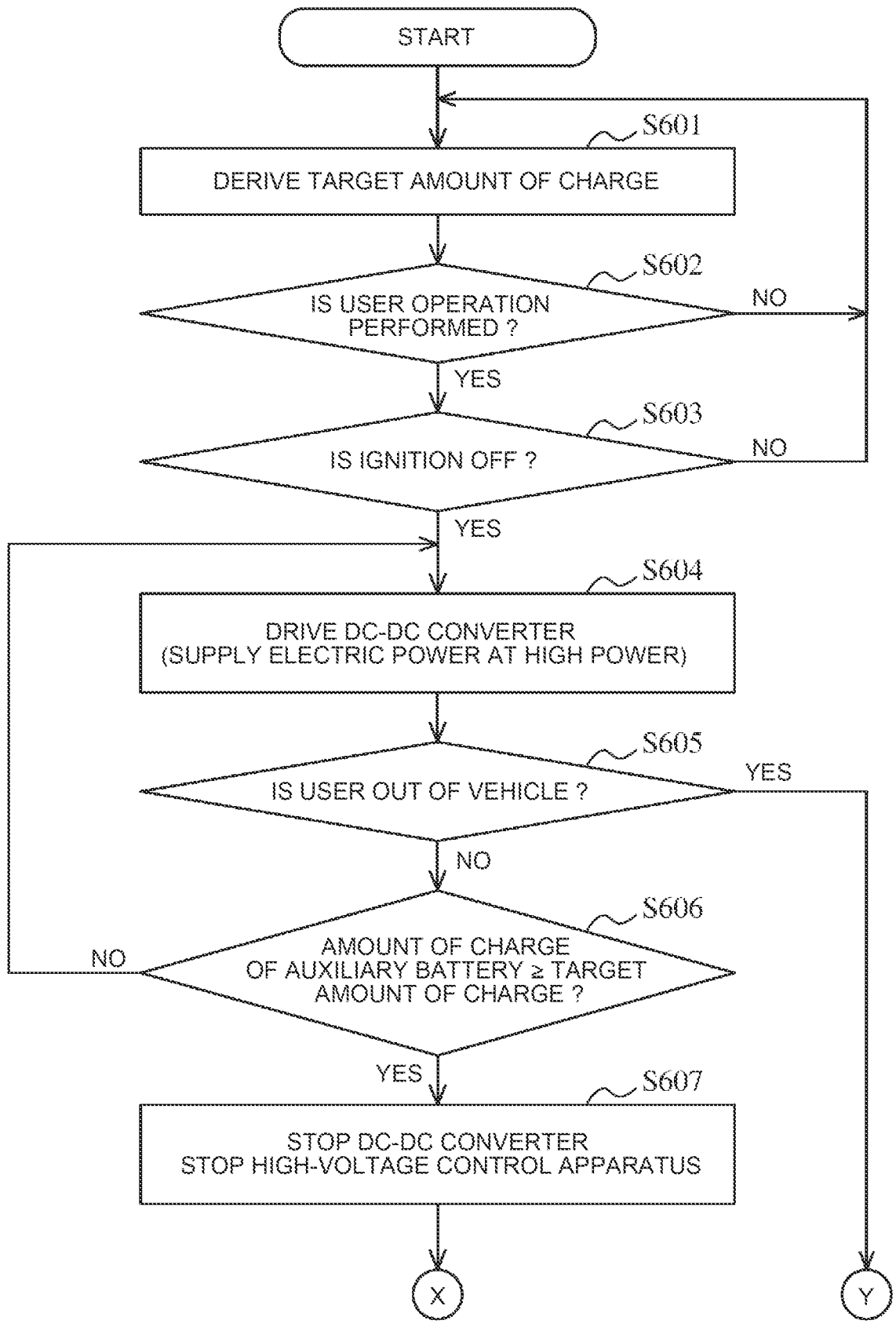
FIG. 6A is a flowchart showing an example of a procedure when a user gets out of the vehicle based on second control.
Figure 6B:
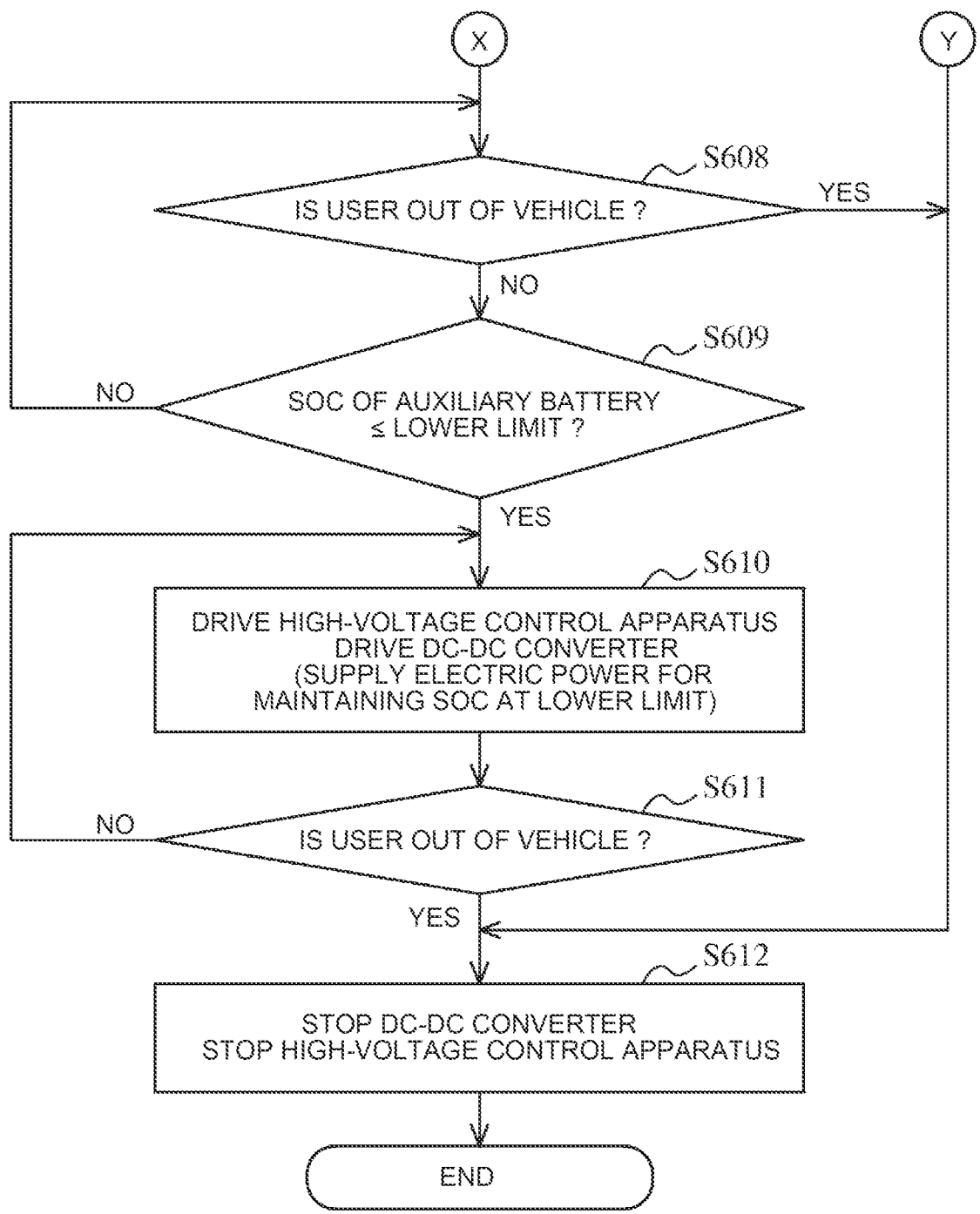
FIG. 6B is a flowchart showing an example of the procedure when a user gets out of the vehicle based on second control.
Figure 7:
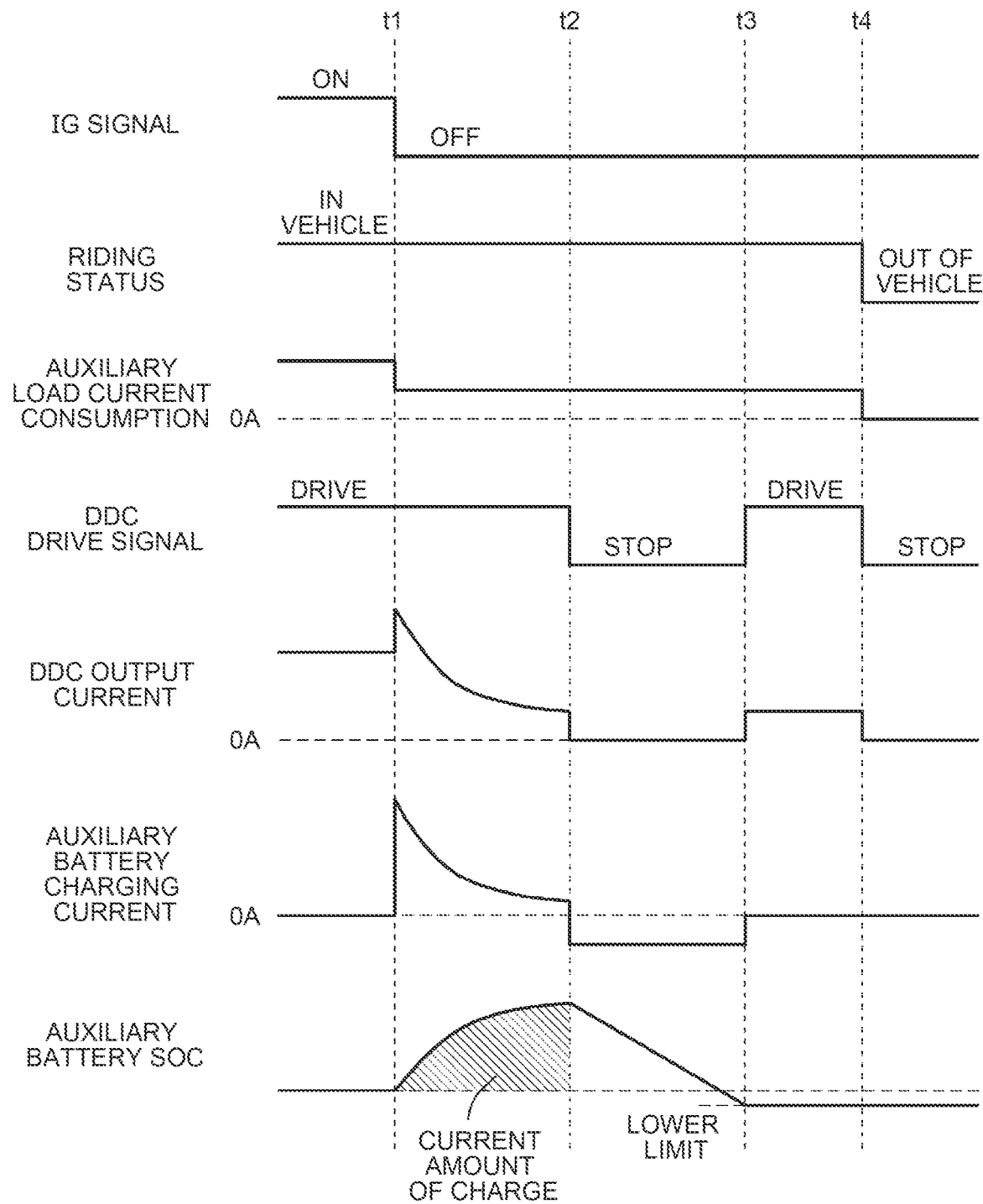
FIG. 7 is a timing chart showing an example of the operation timing when a user gets out of the vehicle based on second control.

FIG. 6A and FIG. 6B are flowcharts showing a procedure of second control to be executed by the components of the vehicle control apparatus 200. The process of FIG. 6A and the process of FIG. 6B are connected by connectors X and Y. FIG. 7 is a timing chart showing an example of the operation timing of the components based on second control. An example shown in FIG. 6A, FIG. 6B, and FIG. 7 is an example when a user gets out of the vehicle and describes control in a situation in which the ignition of the vehicle is switched from the on state to the off state, then the vehicle door is opened and closed, and then the vehicle door is locked.

Step S601

The acquisition unit 240 sets a target amount of charge of the auxiliary battery 140. As described above, the target amount of charge is derived based on, in a state where the ignition of the vehicle is off and it is estimated that the user is in the vehicle, an electric power (load power consumption) consumed by the second auxiliary load 170 in that state and the duration (riding time) of that state. When the target amount of charge of the auxiliary battery 140 is set, the process proceeds to step S602.

Step S602

The detection unit 230 determines whether a user operation (first operation) that can be performed by the user in the vehicle is detected. The user operation when the user is in the vehicle is as described above. When the user operation is detected (YES in step S602), it is estimated that the user is still in the vehicle, and the process proceeds to step S603; otherwise (NO in step S602), the process proceeds to step S601.

Step S603

The determination unit 220 determines whether the ignition of the vehicle is off based on the IG-ON signal. When the ignition is off (YES in step S603), the process proceeds to step S604; otherwise (NO in step S603), the process proceeds to step S601.

Step S604

The operation control unit 210 drives the DC-DC converter 130. Specifically, the operation control unit 210 outputs a drive signal having a set voltage command value at which current can be supplied to the auxiliary battery 140 at high power, to the DC-DC converter 130 (t1 in FIG. 7: DDC drive signal, DDC output current). Through this control, current is supplied from the high-voltage battery 110 to the auxiliary battery 140 (t1 in FIG. 7: auxiliary battery charging current), and the auxiliary battery 140 is charged (t1 in FIG. 7: auxiliary battery SOC). When the DC-DC converter 130 is driven, the process proceeds to step S605.

Step S605

The detection unit 230 determines whether an operation (third operation) based on which it is estimated that the user is out of the vehicle is detected. Estimation of the fact that the user is out of the vehicle is as described above. When it is not estimated that the user is out of the vehicle (NO in step S605), the process proceeds to step S606; whereas, when it is estimated that the user is out of the vehicle (YES in step S605), the process proceeds to step S612. When the user is out of the vehicle (t4 in FIG. 7: riding status), the current consumption of the auxiliary battery 140 by the second auxiliary load 170 disappears (t4 in FIG. 7: auxiliary load current consumption, auxiliary battery charging current), and the state of charge of the auxiliary battery 140 also does not decrease (t4 in FIG. 7: auxiliary battery SOC).

Step S606

The acquisition unit 240 determines whether the current amount of charge of the auxiliary battery 140 (the shaded area of the auxiliary battery SOC in FIG. 7), obtained by evaluating a time integral of the current value and voltage value of the auxiliary battery 140, input from the battery sensor 150, is greater than or equal to the target amount of charge of the auxiliary battery 140. When the current amount of charge is greater than or equal to the target amount of charge (YES in step S606), the process proceeds to step S607; otherwise (NO in step S606), the process proceeds to step S604.

Step S607

The operation control unit 210 stops the DC-DC converter 130. Specifically, the operation control unit 210 outputs a drive signal having a set voltage command value indicating that no electric power is supplied to the auxiliary battery 140, to the DC-DC converter 130 (t2 in FIG. 7: DDC drive signal). Through this control, no current is supplied from the high-voltage battery 110 to the auxiliary battery 140 (t2 in FIG. 7: DDC output current), and charging of the auxiliary battery 140 is stopped (t2 in FIG. 7: auxiliary battery charging current). After charging of the auxiliary battery 140 is stopped, the current consumption of the auxiliary battery 140 by the second auxiliary load 170 proceeds, and the state of charge (SOC) of the auxiliary battery 140 decreases (t2 to t3 in FIG. 7: auxiliary battery SOC). The operation control unit 210 makes a request to the high-voltage control apparatus 300 to stop its operation. Thus, the high-voltage main relay 120 is cut off, and the operation of the high-voltage control apparatus 300 stops. The process to stop the operation of the high-voltage control apparatus 300 is not indispensable. When the DC-DC converter 130 is stopped and the operation of the high-voltage control apparatus 300 is stopped, the process proceeds to step S608.

Step S608

The detection unit 230 determines whether an operation (second operation) based on which it is estimated that the user is out of the vehicle is detected. Estimation of the fact that the user is out of the vehicle is as described above. When it is estimated that the user is out of the vehicle (YES in step S608), the process proceeds to step S612; whereas, when it is not estimated that the user is out of the vehicle (NO in step S608), the process proceeds to step S609.

Step S609

The acquisition unit 240 determines whether the state of charge (SOC) of the auxiliary battery 140 is lower than or equal to a predetermined lower limit. The lower limit is a threshold (first threshold) appropriately set for the purpose of suppressing a decrease in the service life and running out of the auxiliary battery 140. The state of charge of the auxiliary battery 140 can be calculated by using a known method based on the battery state input from the battery sensor 150. When the state of charge of the auxiliary battery 140 is lower than or equal to the lower limit (YES in step S609), the process proceeds to step S610; otherwise (NO in step S609), the process proceeds to step S608.

Step S610

The operation control unit 210 makes a request to the high-voltage control apparatus 300 to drive its operation. Thus, the high-voltage main relay 120 is connected, and the operation of the high-voltage control apparatus 300 operates. The operation control unit 210 drives the DC-DC converter 130. Specifically, the operation control unit 210 outputs a drive signal having a set voltage command value at which current for maintaining the state of charge (SOC) of the auxiliary battery 140 at the lower limit is supplied, to the DC-DC converter 130 (t3 in FIG. 7: DDC drive signal, DDC output current). Through this control, no current is supplied from the high-voltage battery 110 to the auxiliary battery 140 (t3 in FIG. 7: auxiliary battery charging current), and the state of charge of the auxiliary battery 140 is maintained at the lower limit (t3 to t4 in FIG. 7: auxiliary battery SOC). When the high-voltage control apparatus 300 and the DC-DC converter 130 are driven, the process proceeds to step S611.

Step S611

The detection unit 230, as in the case of step S608, determines whether an operation (second operation) based on which it is estimated that the user is out of the vehicle is detected. Estimation of the fact that the user is out of the vehicle is as described above. When it is estimated that the user is out of the vehicle (YES in step S611), the process proceeds to step S612; whereas, when it is not estimated that the user is out of the vehicle (NO in step S611), the process proceeds to step S610.

Step S612

The operation control unit 210 stops the DC-DC converter 130. Specifically, the operation control unit 210 outputs a drive signal having a set voltage command value indicating that no electric power is supplied to the auxiliary battery 140, to the DC-DC converter 130 (t4 in FIG. 7: DDC drive signal). Through this control, no current is supplied from the high-voltage battery 110 to the auxiliary battery 140 (t4 in FIG. 7: DDC output current), and charging of the auxiliary battery 140 is stopped (t4 in FIG. 7: auxiliary battery charging current). The operation control unit 210 makes a request to the high-voltage control apparatus 300 to stop its operation. Thus, the high-voltage main relay 120 is cut off, and the operation of the high-voltage control apparatus 300 stops. When the DC-DC converter 130 is stopped and the operation of the high-voltage control apparatus 300 is stopped, the second control ends.

The process to stop the operation of the high-voltage control apparatus 300 in step S607 and step S612 does not need to be executed when, for example, the influence of electric power to be consumed by the high-voltage control apparatus 300 on power management of the vehicle is small.

In this way, in second control, in a state where the ignition of the vehicle is off when the user gets out of the vehicle and it is estimated that the user is in the vehicle, the auxiliary battery 140 is charged from the high-voltage battery 110 until the amount of charge reaches the target amount of charge (t1 to t2 in FIG. 7). The target amount of charge is set based on an estimated electric power to be consumed by the second auxiliary load 170 in a period from when the ignition is turned off to when the user completes getting out of the vehicle. Therefore, it is possible to enhance the operational efficiency of the DC-DC converter 130 by continuously charging the auxiliary battery 140 up to the target amount of charge.

Furthermore, in second control, after charging of the auxiliary battery 140 to the target amount of charge is complete, when the state of charge of the auxiliary battery 140 reaches the lower limit, electric power is supplied from the high-voltage battery 110 by driving the DC-DC converter 130 until it is determined that the user is out of the vehicle in order to suppress a decrease in the state of charge (SOC) of the auxiliary battery 140 resulting from continuous power consumption of the second auxiliary load 170. Thus, even when the riding time of the user after the ignition is turned off is long, it is possible to avoid a decrease in the state of charge of the auxiliary battery 140 below the lower limit.

Figure 8A:
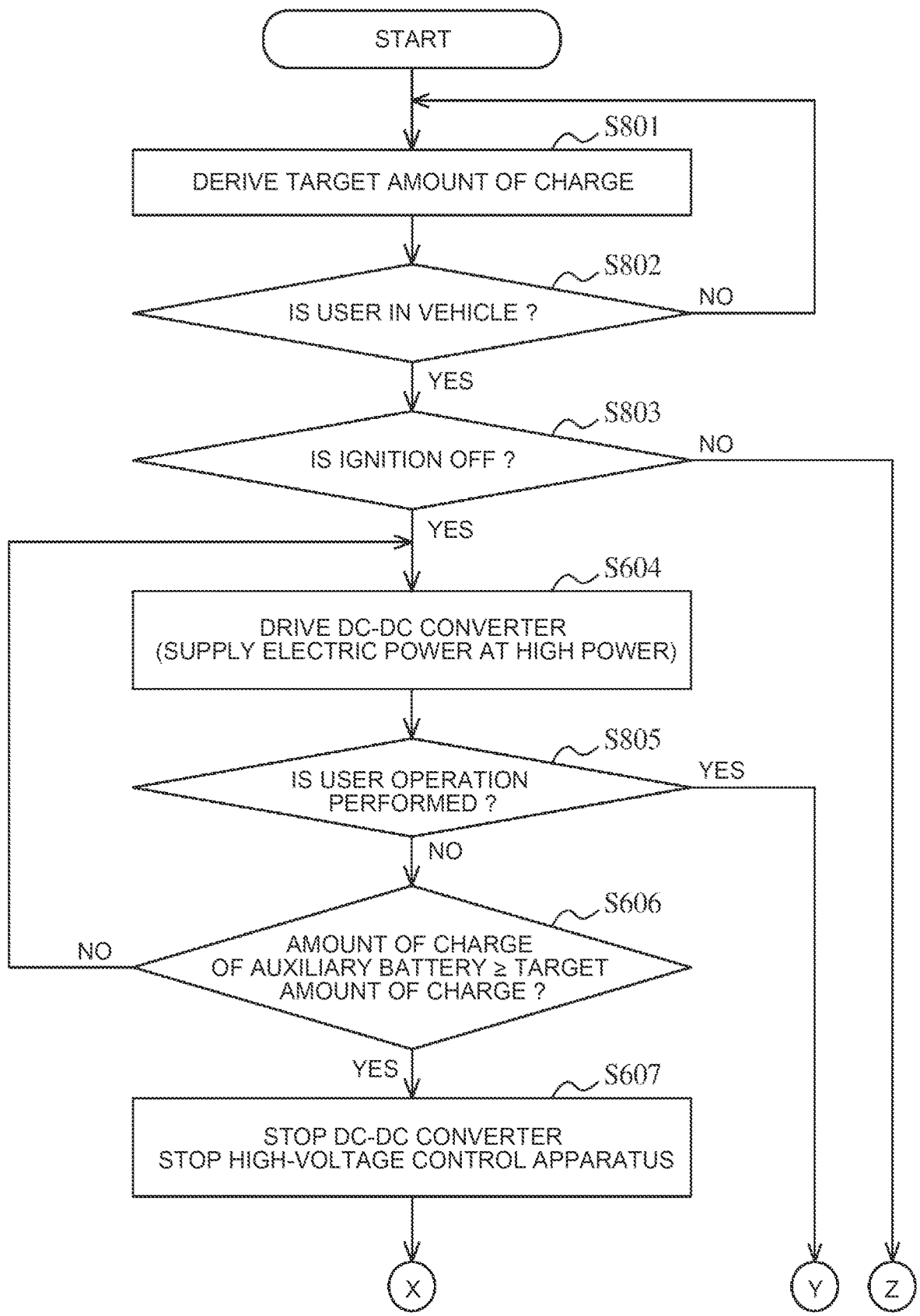
FIG. 8A is a flowchart showing an example of a procedure when a user gets into the vehicle based on second control.
Figure 9:
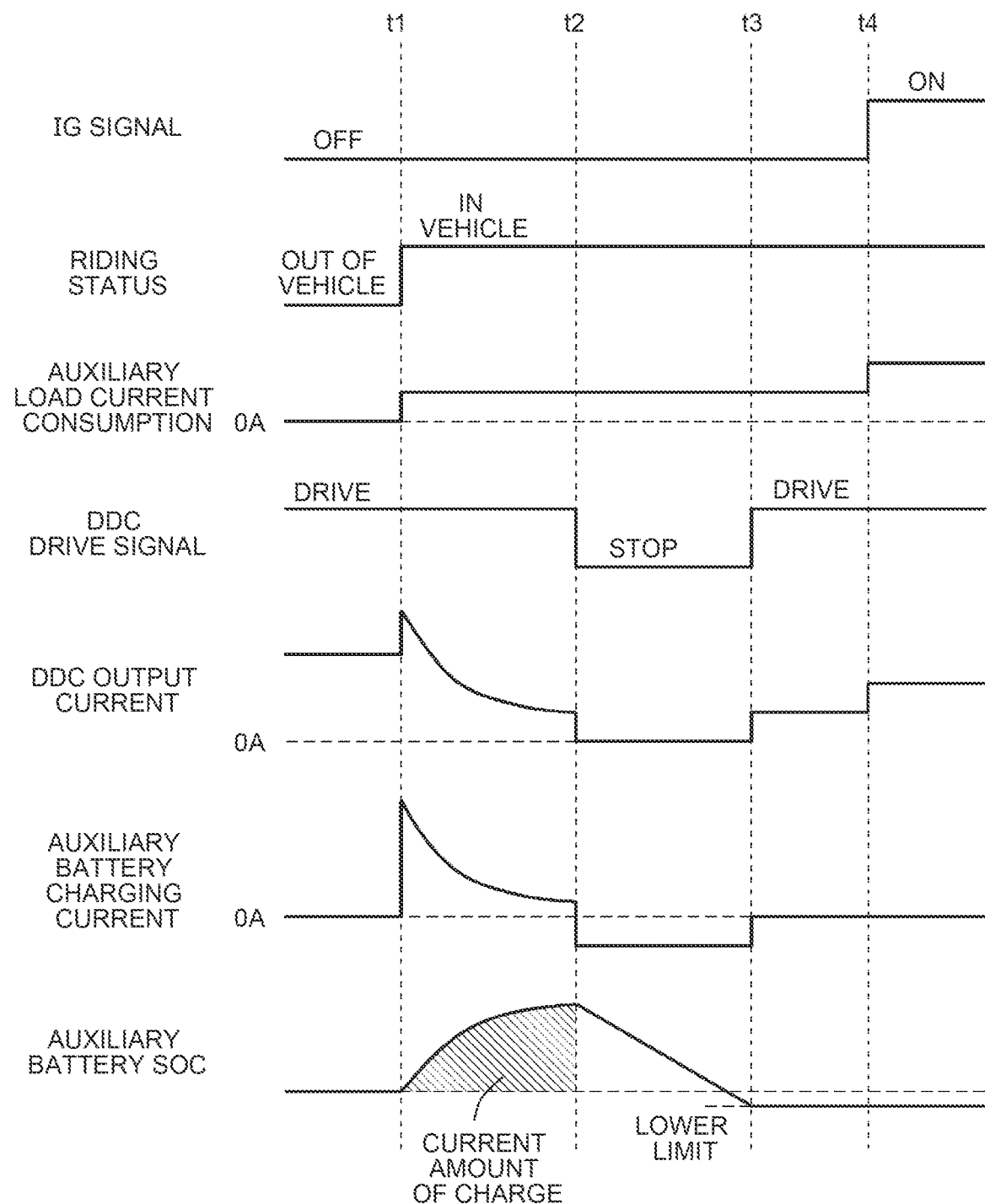
FIG. 9 is a timing chart showing an example of the operation timing when a user gets into the vehicle based on second control.

FIG. 8A, FIG. 8B, and FIG. 9 are an example of second control when a user gets into the vehicle and illustrate control in which the vehicle door is unlocked while the ignition of the vehicle is off, then the vehicle door is opened and closed, and then the ignition is turned on.

The process flowchart when a user gets into the vehicle (FIG. 8A and FIG. 8B) differs from the process flowchart when a user gets out of the vehicle (FIG. 6A and FIG. 6B) in the processes of step S801, step S802, step S803, step S805, step S808, and step S811. The process of FIG. 8A and the process of FIG. 8B are connected by connectors X, Y, and Z.

In step S801 of FIG. 8A, a riding time for setting a target amount of charge is an elapsed time from when an operation (first operation) based on which it is estimated that the user is in the vehicle (described later) is detected to when a user operation (second operation or third operation) that is performed after the user gets into the vehicle is detected. In step S802 of FIG. 8A, the detection unit 230 determines whether the operation (first operation) based on which it is estimated that the user is in the vehicle is detected. Estimation of the fact that the user is in the vehicle is as described above. In step S803 of FIG. 8A, the detection unit 230 determines whether the ignition of the vehicle is off. When it is determined in step S803 that the ignition is not off, the second control ends. In step S805, step S808, and step S811 of FIG. 8A and FIG. 8B, the detection unit 230 determines whether the user operation (second operation or third operation) performed by the user after the user gets into the vehicle is detected. In this example when the user gets into the vehicle, an operation to depress the ignition switch button in order to switch the ignition from the off state to the on state corresponds to the user operation.

In this way, in second control, when the user gets into the vehicle, as in the case of the above-described example when the user gets out of the vehicle, in a state where the ignition of the vehicle is off and it is estimated that the user is in the vehicle, the auxiliary battery 140 is charged from the high-voltage battery 110 until the amount of charge reaches the target amount of charge (t1 to t2 in FIG. 9). When the target amount of charge is set based on an estimated electric power to be consumed by the second auxiliary load 170 in a period from when the user gets into the vehicle to when the ignition turns on, it is possible to enhance the operational efficiency of the DC-DC converter 130 by continuously charging the auxiliary battery 140 up to the target amount of charge. In addition, when the state of charge (SOC) of the auxiliary battery 140 reaches the lower limit (t3 in FIG. 9: auxiliary battery SOC), electric current is supplied from the high-voltage battery 110 to the second auxiliary load 170 such that the lower limit is maintained (t3 to t4 in FIG. 9: DDC drive signal, DDC output current). Thus, it is possible to avoid a decrease in the state of charge of the auxiliary battery 140. After the ignition is turned on, normal power control is performed (t4 in FIG. 9).

(3) Third Control

Figure 10A:
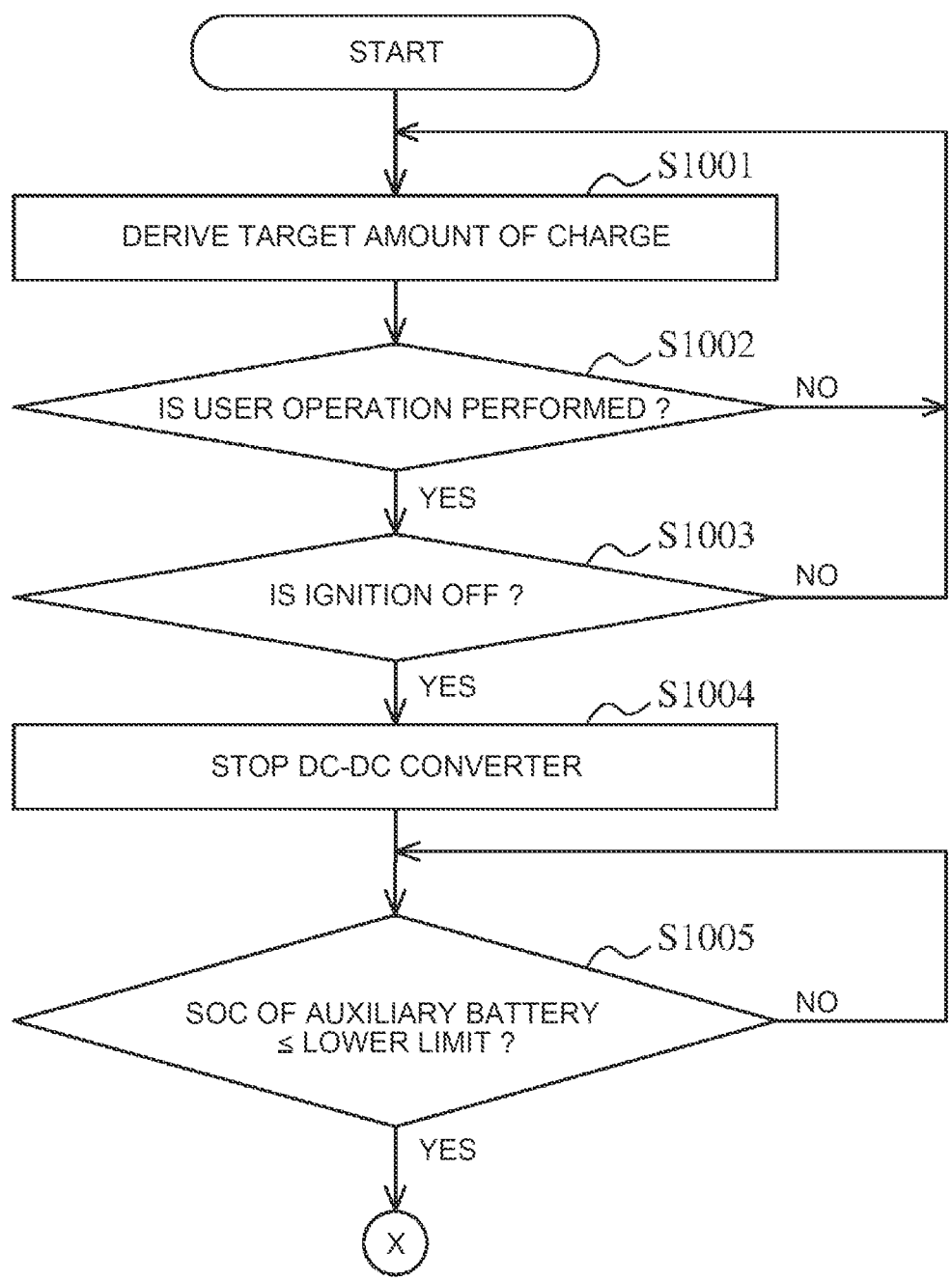
FIG. 10A is a flowchart showing an example of a procedure when a user gets out of the vehicle based on third control.
Figure 10B:
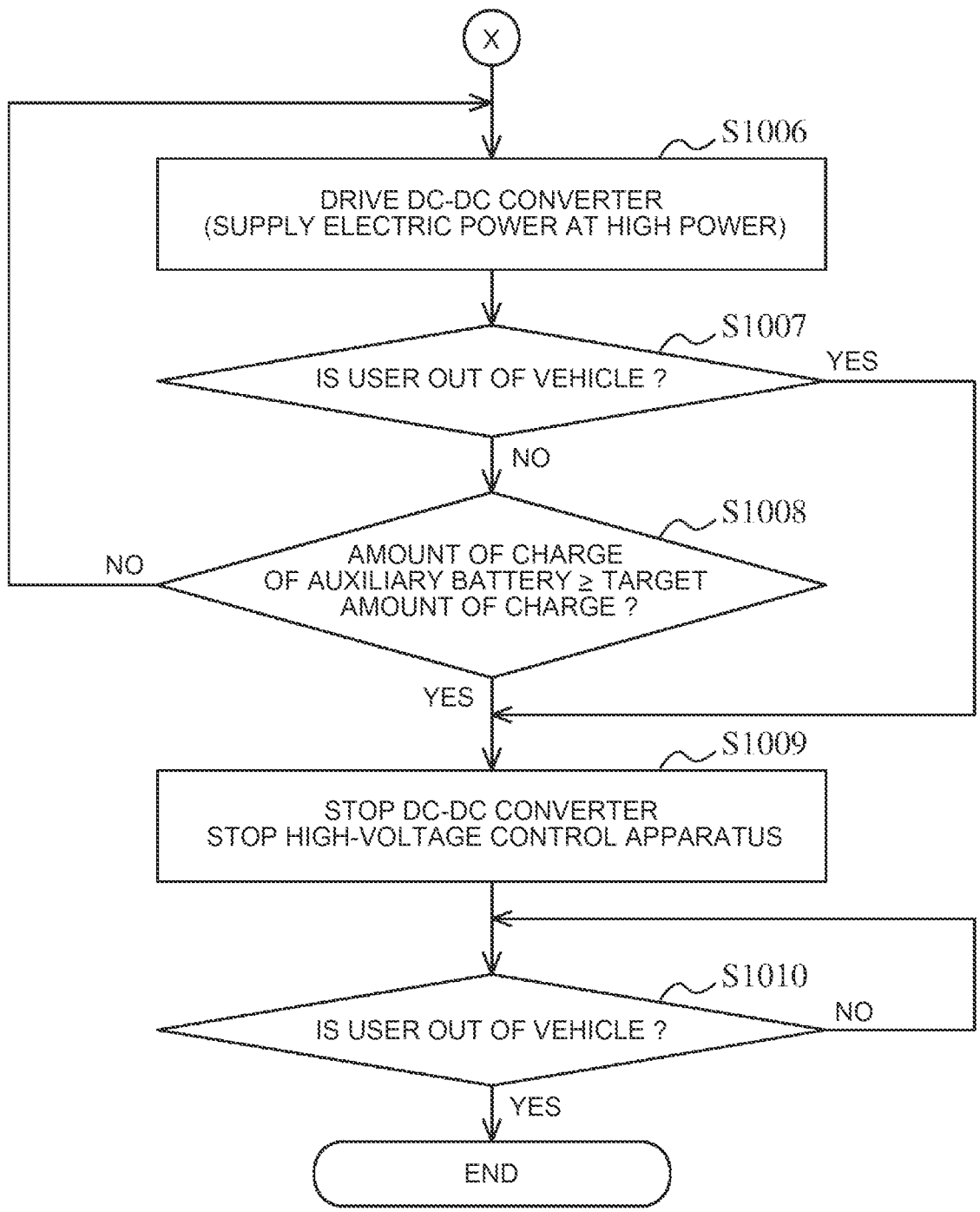
FIG. 10B is a flowchart showing an example of the procedure when a user gets out of the vehicle based on third control.
Figure 11:
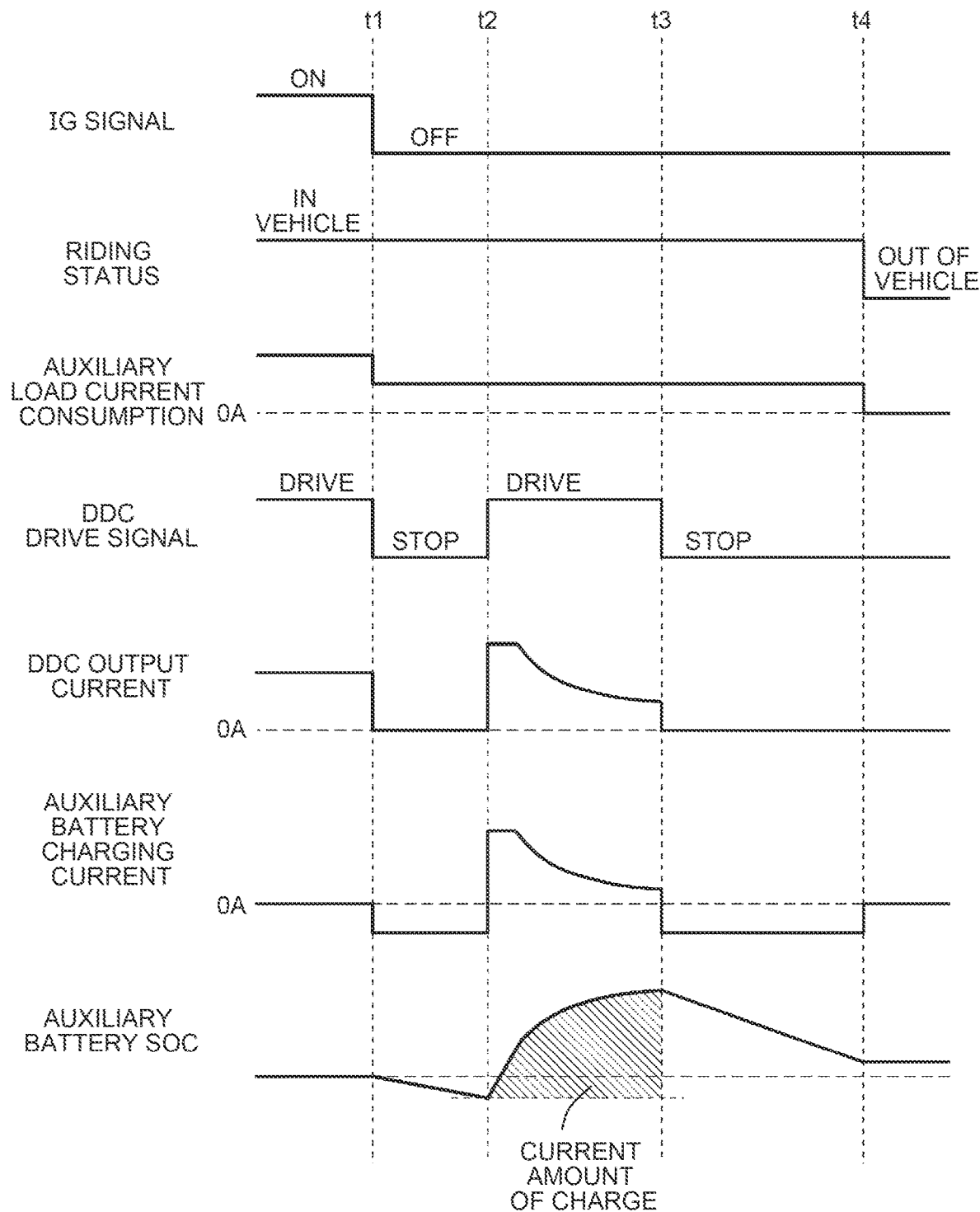
FIG. 11 is a timing chart showing an example of the operation timing when a user gets out of the vehicle based on third control.

FIG. 10A and FIG. 10B are flowcharts showing a procedure of third control to be executed by the components of the vehicle control apparatus 200. The process of FIG. 10A and the process of FIG. 10B are connected by a connector X. FIG. 11 is a timing chart showing an example of the operation timing of the components based on third control. An example shown in FIG. 10A, FIG. 10B, and FIG. 11 is an example when a user gets out of the vehicle and describes control in a situation in which the ignition of the vehicle is switched from the on state to the off state, then the vehicle door is opened and closed, and then the vehicle door is locked.

Step S1001

The acquisition unit 240 sets a target amount of charge of the auxiliary battery 140. As described above, the target amount of charge is derived based on, in a state where the ignition of the vehicle is off and it is estimated that the user is in the vehicle, an electric power (load power consumption) consumed by the second auxiliary load 170 in that state and the duration (riding time) of that state. When the target amount of charge of the auxiliary battery 140 is set, the process proceeds to step S1002.

Step S1002

The detection unit 230 determines whether the user operation (first operation) that can be performed by the user in the vehicle is detected. The user operation when the user is in the vehicle is as described above. When the user operation is detected (YES in step S1002), it is estimated that the user is still in the vehicle, and the process proceeds to step S1003; otherwise (NO in step S1002), the process proceeds to step S1001.

Step S1003

The determination unit 220 determines whether the ignition of the vehicle is off based on the IG-ON signal. When the ignition is off (YES in step S1003), the process proceeds to step S1004; otherwise (NO in step S1003), the process proceeds to step S1001.

Step S1004

The operation control unit 210 stops the DC-DC converter 130. Specifically, the operation control unit 210 outputs a drive signal having a set voltage command value indicating that no electric power is supplied to the auxiliary battery 140, to the DC-DC converter 130 (t1 in FIG. 11: DDC drive signal). Through this control, no current is supplied from the high-voltage battery 110 to the auxiliary battery 140 (t1 in FIG. 11: DDC output current), the current consumption of the auxiliary battery 140 by the second auxiliary load 170 proceeds, and the state of charge (SOC) of the auxiliary battery 140 decreases (t1 to t2 in FIG. 11: auxiliary battery SOC). When the DC-DC converter 130 is stopped, the process proceeds to step S1005.

Step S1005

The acquisition unit 240 determines whether the state of charge (SOC) of the auxiliary battery 140 is lower than or equal to a predetermined lower limit. The lower limit is a threshold (second threshold) appropriately set for the purpose of enhancing the charging efficiency of auxiliary battery 140. The lower limit (second threshold) in this third control may be the same or may be different from the lower limit (first threshold) in the second control. The state of charge of the auxiliary battery 140 can be calculated by using a known method based on the battery state input from the battery sensor 150. When the state of charge of the auxiliary battery is lower than or equal to the lower limit (YES in step S1005), the process proceeds to step S1006; otherwise (NO in step S1005), the process repeats the determination of step S1005 until the state of charge becomes lower than or equal to the lower limit.

Step S1006

The operation control unit 210 drives the DC-DC converter 130. Specifically, the operation control unit 210 outputs a drive signal having a set voltage command value at which current can be supplied to the auxiliary battery 140 at high power, to the DC-DC converter 130 (t2 in FIG. 11: DDC drive signal, DDC output current). Through this control, current is supplied from the high-voltage battery 110 to the auxiliary battery 140 (t2 in FIG. 11: auxiliary battery charging current), and the auxiliary battery 140 is charged (t2 in FIG. 11: auxiliary battery SOC). When the DC-DC converter 130 is driven, the process proceeds to step S1007.

Step S1007

The detection unit 230 determines whether an operation (third operation) based on which it is estimated that the user is out of the vehicle is detected. Estimation of the fact that the user is out of the vehicle is as described above. When it is not estimated that the user is out of the vehicle (NO in step S1007), the process proceeds to step S1008, whereas, when it is estimated that the user is out of the vehicle (YES in step S1007), the process proceeds to step S1009. When the user is out of the vehicle (t4 in FIG. 11: riding status), the current consumption of the auxiliary battery 140 by the second auxiliary load 170 disappears (t4 in FIG. 11: auxiliary load current consumption, auxiliary battery charging current), and the state of charge of the auxiliary battery 140 also does not decrease (t4 in FIG. 11: auxiliary battery SOC).

Step S1008

The acquisition unit 240 determines whether the current amount of charge of the auxiliary battery 140 (the shaded area of the auxiliary battery SOC in FIG. 11), obtained by evaluating a time integral of the current value and voltage value of the auxiliary battery 140, input from the battery sensor 150, is greater than or equal to the target amount of charge of the auxiliary battery 140. When the current amount of charge is greater than or equal to the target amount of charge (YES in step S1008), the process proceeds to step S1009; otherwise (NO in step S1008), the process proceeds to step S1006.

Step 1009

The operation control unit 210 stops the DC-DC converter 130. Specifically, the operation control unit 210 outputs a drive signal having a set voltage command value indicating that no electric power is supplied to the auxiliary battery 140, to the DC-DC converter 130 (t3 in FIG. 11: DDC drive signal). Through this control, no current is supplied from the high-voltage battery 110 to the auxiliary battery 140 (t3 in FIG. 11: DDC output current), and charging of the auxiliary battery 140 is stopped (t3 in FIG. 11: auxiliary battery charging current). After charging of the auxiliary battery 140 is stopped, the current consumption of the auxiliary battery 140 by the second auxiliary load 170 proceeds, and the state of charge (SOC) of the auxiliary battery 140 decreases (t3 to t4 in FIG. 11: auxiliary battery SOC). The operation control unit 210 makes a request to the high-voltage control apparatus 300 to stop its operation. Thus, the high-voltage main relay 120 is cut off, and the operation of the high-voltage control apparatus 300 stops. The process to stop the operation of the high-voltage control apparatus 300 does not need to be executed when, for example, the influence of electric power to be consumed by the high-voltage control apparatus 300 on power management of the vehicle is small. When the DC-DC converter 130 is stopped and the operation of the high-voltage control apparatus 300 is stopped, the process proceeds to step S1010.

Step S1010

The detection unit 230 determines whether an operation (second operation) based on which it is estimated that the user is out of the vehicle is detected. Estimation of the fact that the user is out of the vehicle is as described above. When it is not estimated that the user is out of the vehicle (NO in step S1010), the process repeats the determination of step S1010; whereas, when it is estimated that the user is out of the vehicle (YES in step S1010), the third control ends.

In this way, in third control, in a state where the ignition of the vehicle is off when the user gets out of the vehicle and it is estimated that the user is in the vehicle, the auxiliary battery 140 is initially discharged (supplies electric power) until the state of charge (SOC) of the auxiliary battery 140 becomes the lower limit (t1 to t2 in FIG. 11). After that, the auxiliary battery 140 is charged from the high-voltage battery 110 until the amount of charge reaches the target amount of charge (t2 to t3 in FIG. 11). Thus, the range of the state of charge in which the auxiliary battery 140 can be charged expands, and a charging current per unit time supplied from the DC-DC converter 130 to the auxiliary battery 140 is increased. In addition, by the amount by which the state of charge of the auxiliary battery 140 is decreased to the lower limit, the target amount of charge can be set to a larger value. Thus, the operational efficiency of the DC-DC converter 130 is further enhanced.

After the amount of charge of the auxiliary battery 140 reaches the target amount of charge (t3 in FIG. 11) in this third control, the process of maintaining the state of charge (SOC) of the auxiliary battery 140, which is executed after step S609 of second control, may be further executed. When the second control and the third control are combined in this way, it is possible to achieve both enhancement of the operational efficiency of the DC-DC converter 130 and avoidance of a decrease in the state of charge of the auxiliary battery 140.

Figure 12A:
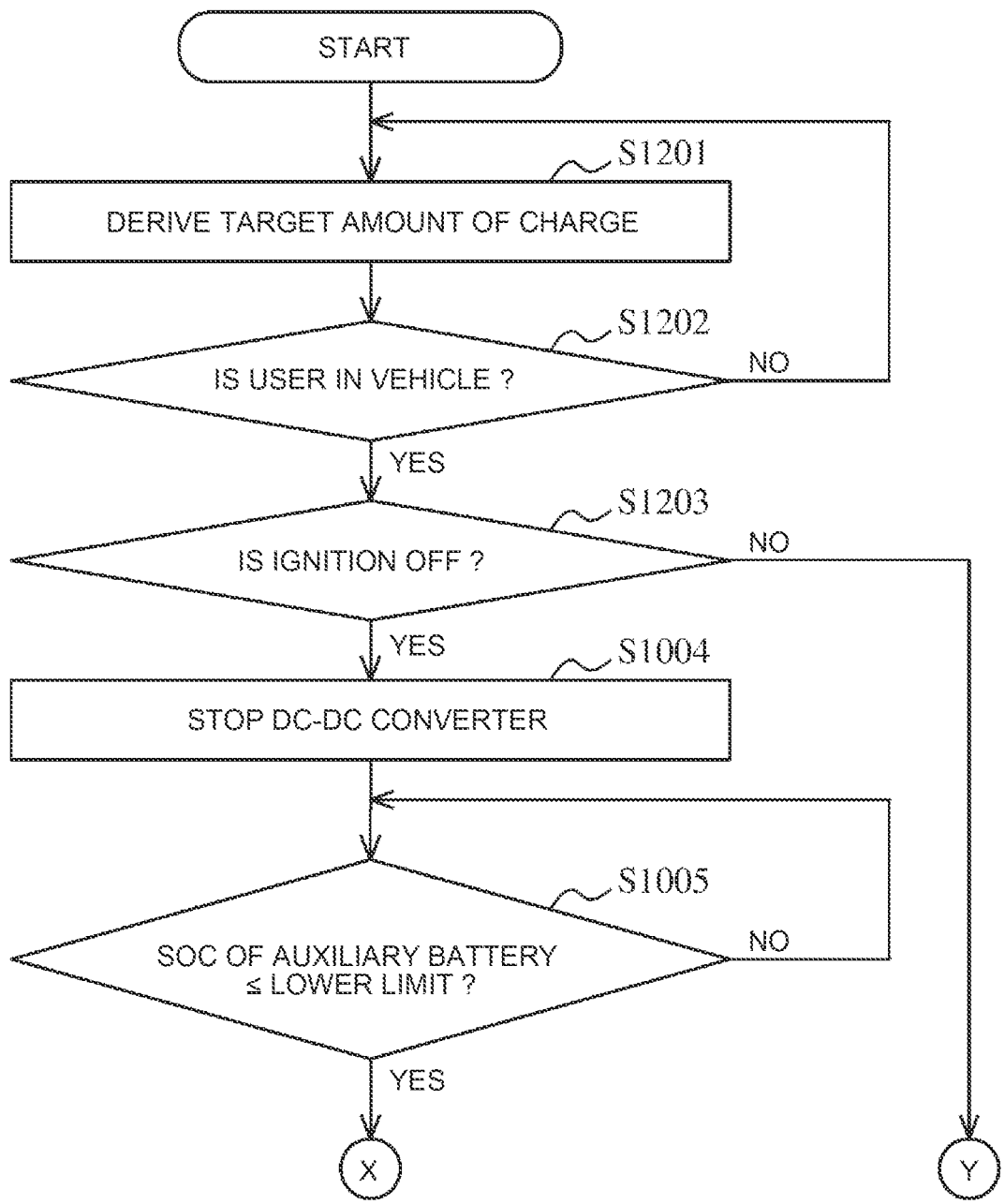
FIG. 12A is a flowchart showing an example of a procedure when a user gets into the vehicle based on third control.
Figure 13:
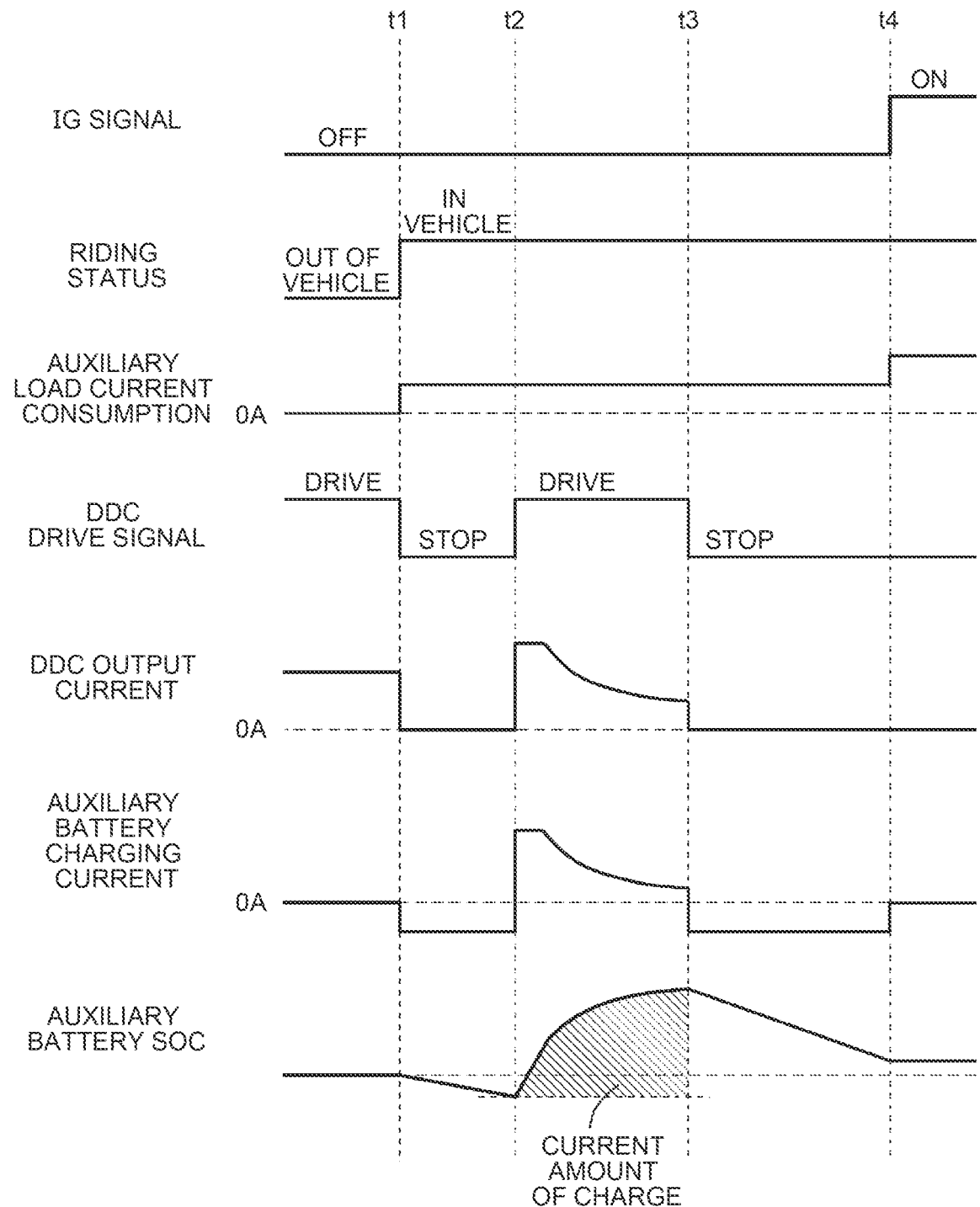
FIG. 13 is a timing chart showing an example of the operation timing when a user gets into the vehicle based on third control.

FIG. 12A, FIG. 12B, and FIG. 13 are an example of third control when a user gets into the vehicle and illustrate control in which the vehicle door is unlocked while the ignition of the vehicle is off, then the vehicle door is opened and closed, and then the ignition is turned on.

The process flowchart when a user gets into the vehicle (FIG. 12A and FIG. 12B) differs from the process flowchart when a user gets out of the vehicle (FIG. 10A and FIG. 10B) in the processes of step S1201, step S1202, step S1203, step S1207, and step S1210. The process of FIG. 12A and the process of FIG. 12B are connected by connectors X and Y.

In step S1201 of FIG. 12A, a riding time for setting a target amount of charge is an elapsed time from when an operation (first operation) based on which it is estimated that the user is in the vehicle (described later) is detected to when a user operation (second operation or third operation) that is performed after the user gets into the vehicle is detected. In step S1202 of FIG. 12A, the detection unit 230 determines whether the operation (first operation) based on which it is estimated that the user is in the vehicle is detected. Estimation of the fact that the user is in the vehicle is as described above. In step S1203 of FIG. 12A, the detection unit 230 determines whether the ignition of the vehicle is off. When it is determined in step S1203 that the ignition is not off, the third control ends. In step S1207 and step S1210 of FIG. 12B, the detection unit 230 determines whether the user operation (second operation or third operation) performed by the user after the user gets into the vehicle is detected. In this example when the user gets into the vehicle, an operation to depress the ignition switch button in order to switch the ignition from the off state to the on state corresponds to the user operation.

In this way, in third control, when the user gets into the vehicle, as in the case of the above-described example when the user gets out of the vehicle, in a state where the ignition of the vehicle is off and it is estimated that the user is in the vehicle, the auxiliary battery 140 is initially discharged (supplies electric power) until the state of charge (SOC) of the auxiliary battery 140 becomes the lower limit (t1 to t2 in FIG. 13), and then the auxiliary battery 140 is charged from the high-voltage battery 110 until the amount of charge reaches the target amount of charge (t2 to t3 in FIG. 13). When the target amount of charge is set based on an estimated electric power to be consumed by the second auxiliary load 170 in a period from when the user gets into the vehicle to when the ignition turns on and the auxiliary battery 140 is continuously charged from the lower limit of the auxiliary battery 140 to the target amount of charge, it is possible to enhance the operational efficiency of the DC-DC converter 130.

In the above-described first control, second control, and third control, when the amount of chargeable electric power is small in, for example, a situation in which the temperature of the auxiliary battery 140 is low, the auxiliary battery 140 can be fully charged (upper limit) before the current amount of charge of the auxiliary battery 140 reaches the target amount of charge. In such a case, when charging is continued as it is, it leads to waste of energy and deterioration of performance of the auxiliary battery 140. Therefore, it is desirable to stop the DC-DC converter 130 at the time when the auxiliary battery 140 is fully charged or at the time when the auxiliary battery 140 is in a predetermined state of charge (SOC) just before being fully charged.

Second Embodiment

Configuration

Figure 14:
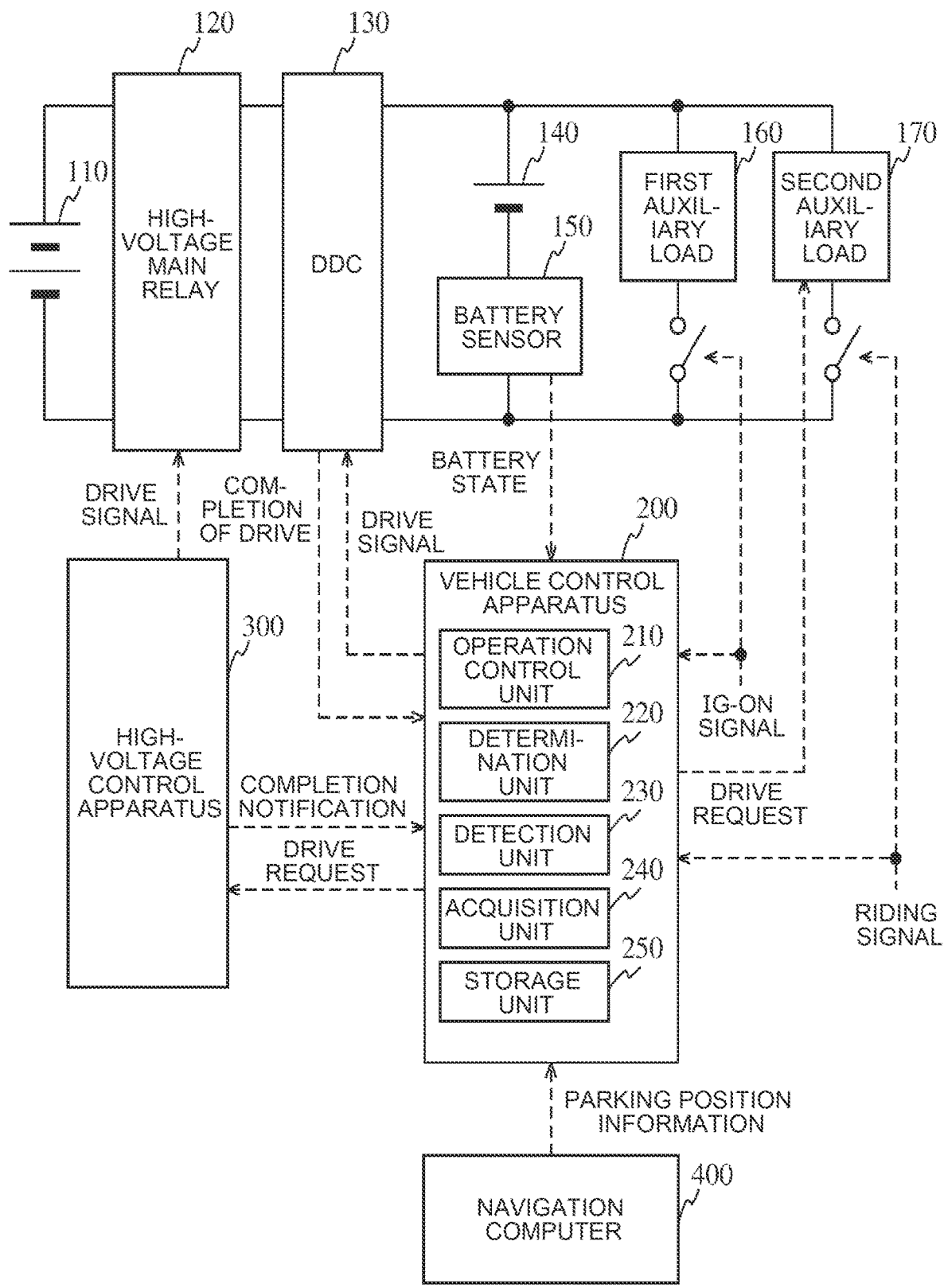
FIG. 14 is a functional block diagram of a vehicle control apparatus and its peripheral components according to a second embodiment.

FIG. 14 is a functional block diagram of the vehicle control apparatus 200 and its peripheral components according to a second embodiment of the disclosure. The functional blocks of the second embodiment, illustrated in FIG. 14, differ from the functional blocks of the first embodiment, illustrated in FIG. 1, in that a storage unit 250 of the vehicle control apparatus 200 and a navigation computer 400 are further provided. The configuration other than the storage unit 250 and the navigation computer 400 is the same between the first embodiment and the second embodiment, so like reference signs are assigned, and the description thereof is omitted.

The storage unit 250 of the vehicle control apparatus 200 stores position-time information that associates a parking position of a vehicle with the duration of a state where it is estimated that a user is in the vehicle at the parking position. The position-time information may be a fixed value given in advance to the vehicle or may be a learning value that changes each time according to the usage of the vehicle. The position-time information may be acquired from a predetermined information server or another vehicle via communication or the like. FIG. 15 shows an example of the position-time information.

In the example of FIG. 15, for each parking position (No. 1, No. 2, No. 3, . . . ), the duration of a state where the ignition is off and a user is in the vehicle when the user gets out of the vehicle (IG-OFF→get out of vehicle) and the duration of a state where the ignition is off and the user is in the vehicle when the user gets into the vehicle (get into vehicle→IG-ON) are stored. A parking position may be a position at which the ignition of the vehicle is turned off. As a time, a mean value of a plurality of times measured in the past at that parking position, a standard deviation obtained from a plurality of times, or the like, may be used. A time at each parking position can be measured and stored in the storage unit 250 each time the vehicle is used.

The navigation computer 400 is a device including a function capable of identifying a position where the vehicle is present. The navigation computer 400 may be, for example, a car navigation system mounted on the vehicle. The navigation computer 400 of the present embodiment outputs, to the vehicle control apparatus 200, at least information on a position where the vehicle is parked or stopped (parking position information), included in information indicating a position where the vehicle is present.

Control

Figure 16:
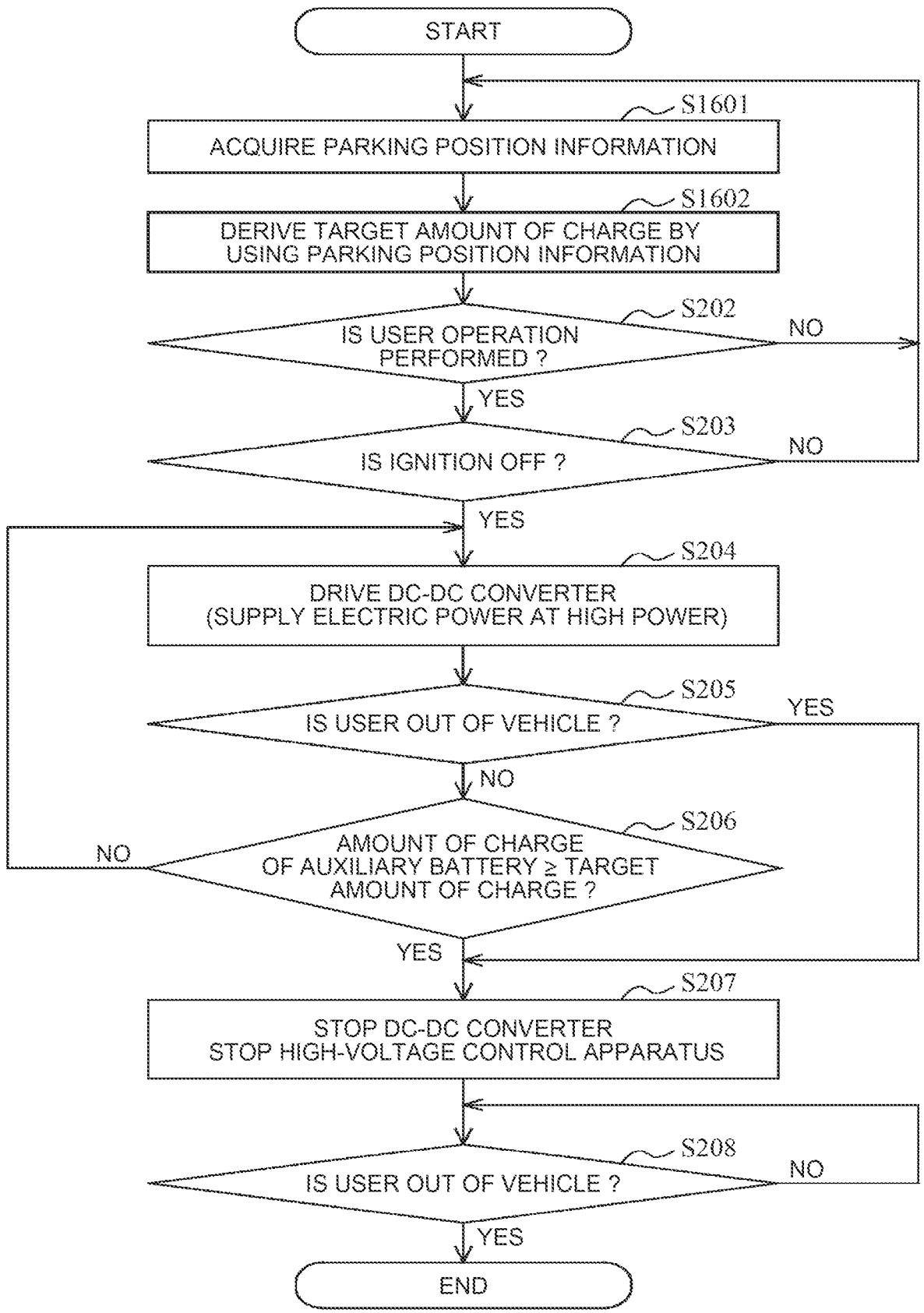
FIG. 16 is a flowchart showing a procedure of a control process to be executed by the vehicle control apparatus according to the second embodiment.

FIG. 16 is a flowchart showing the procedure of first control to be executed by the vehicle control apparatus 200 according to the second embodiment of the disclosure when a user gets out of the vehicle. The process flowchart shown in FIG. 16 differs from the process flowchart shown in FIG. 2 in the processes of step S1601 and step S1602.

Step S1601

When the vehicle stops at a position, the acquisition unit 240 acquires parking position information on that position from the navigation computer 400. When the acquisition unit 240 acquires the parking position information, the process proceeds to step S1602.

Step S1602

The acquisition unit 240 sets a target amount of charge of the auxiliary battery 140 by using the acquired parking position information. Specifically, the acquisition unit 240 sets a time indicated by the parking position information to a riding time that is the duration of a state where the ignition is off and the user is in the vehicle. Then, the acquisition unit 240 sets a value obtained by integrating a load power consumption by using the set riding time as the target amount of charge of the auxiliary battery 140. The load power consumption is an electric power consumed by the second auxiliary load 170 in a state where the ignition is off and the user is in the vehicle.

The processes from step S202 to step S208 shown in FIG. 16 after the target amount of charge of the auxiliary battery 140 is set are as described in the process when a user gets out of the vehicle based on first control (FIG. 2).

In the process when a user gets into the vehicle based on first control (FIG. 4), the process when a user gets out of the vehicle based on second control (FIG. 6A), the process when a user gets into the vehicle based on second control (FIG. 8A), the process when a user gets out of the vehicle based on third control (FIG. 10A), and the process when a user gets into the vehicle based on third control (FIG. 12A) as well, parking position information acquired from the navigation computer 400 may be used when the target amount of charge of the auxiliary battery 140 is set.

Operation and Advantageous Effects

As described above, with the vehicle control apparatus 200 according to the present embodiment, a target amount of charge is set based on an elapsed time from when the ignition is turned off to when a user completes getting out of the vehicle or an elapsed time from when the user starts getting into the vehicle to when the ignition is turned on, and an electric power consumed by the second auxiliary load 170 during the elapsed time. When the vehicle control apparatus 200 determines that the ignition of the vehicle is off and it is estimated that the user is in the vehicle, the auxiliary battery 140 is charged from the high-voltage battery 110 until the amount of charge reaches the target amount of charge.

As in the case of this control, in a state where the ignition of the vehicle is off and it is estimated that the user is in the vehicle, the auxiliary battery 140 is continuously charged up to the target amount of charge set based on the amount of electric power consumed by the second auxiliary load 170 and then stopped. Thus, in comparison with the case where the auxiliary battery 140 is charged without setting a target amount of charge (intermittent operation), the opportunity (the number of times, and a time) to drive the DC-DC converter 130 reduces, so it is possible to enhance the operational efficiency (charging efficiency and power conversion efficiency) of the DC-DC converter 130.

With the vehicle control apparatus 200 according to the present embodiment, when charging of the auxiliary battery 140 up to the target amount of charge completes and then the state of charge (SOC) of the auxiliary battery 140 reaches a predetermined lower limit, the DC-DC converter 130 is driven to supply electric power from the high-voltage battery 110 to the second auxiliary load 170 until it is determined that the user completes getting out of the vehicle or the ignition is on.

Through this control, even when the riding time of the user in a state where the ignition is off is long, it is possible to avoid a decrease in the state of charge of the auxiliary battery 140 below the lower limit due to the power consumption of the second auxiliary load 170.

With the vehicle control apparatus 200 according to the present embodiment, in a state where the ignition of the vehicle is off and it is estimated that the user is in the vehicle, the auxiliary battery 140 is initially discharged (supplies electric power to the second auxiliary load 170) until the state of charge of the auxiliary battery 140 becomes the lower limit.

Through this control, a larger target amount of charge can be set, and a larger amount of charging current can be passed from the DC-DC converter 130 to the auxiliary battery 140, so it is possible to further enhance the operational efficiency of the DC-DC converter 130.

With the vehicle control apparatus 200 according to the present embodiment, the operation of the high-voltage control apparatus 300 is stopped in synchronization with stopping the operation of the DC-DC converter 130.

Through this control, it is possible to reduce the power consumption caused by the high-voltage control apparatus 300 during a stop of the DC-DC converter 130, so it is possible to reduce a decrease in the state of charge of the auxiliary battery 140. There are concerns about an increase in the operation of the high-voltage main relay 120 with a stop of the high-voltage control apparatus 300; however, the frequency of intermittent operation of the DC-DC converter 130 in control of the disclosure is significantly decreased as compared to the existing control. Therefore, it is possible to achieve both the durability of the high-voltage main relay 120 and a reduction in power consumption.

The embodiments of the disclosure are described above. The disclosure may be implemented as a vehicle control apparatus, a control method to be executed by the vehicle control apparatus, a control program, a non-transitory computer-readable storage medium storing the control program, or a vehicle including the vehicle control apparatus.

The vehicle control apparatus and the like of the disclosure are usable in an electrically-powered vehicle, such as a hybrid vehicle (HV), a plug-in hybrid vehicle (PHV), and an electric vehicle (EV), equipped with a high-voltage battery for driving of the vehicle.

What is claimed is:

1. A vehicle control apparatus mounted on a vehicle including a DC-DC converter that supplies electric power from a first battery related to driving of the vehicle to a second battery, different from the first battery, and an auxiliary load that uses the second battery as a power supply, the vehicle control apparatus comprising:
an electronic control unit configured to
control an operation of the DC-DC converter,
determine a state of a starter switch of the vehicle,
detect an operation of a user to the vehicle, and
acquire information on a charging status of the second battery, wherein:
the electronic control unit is configured to
when the electronic control unit detects a first operation by the user and determines that the starter switch is off, drive the DC-DC converter such that the DC-DC converter charges the second battery,
when an amount of electric power charged in the second battery, which is included in the acquired information on the charging status of the second battery, reaches a target amount of charge set based on an amount of electric power to be consumed by the auxiliary load while the starter switch is off, stop the DC-DC converter, and
when a state of charge of the second battery, which is included in the acquired information on the charging status of the second battery, becomes lower than or equal to a first threshold after the DC-DC converter is stopped, drive the DC-DC converter again such that the DC-DC converter supplies electric power to the auxiliary load while maintaining the state of charge of the second battery at the first threshold.

2. The vehicle control apparatus according to claim 1, wherein the amount of electric power to be consumed by the auxiliary load is set based on an electric power to be consumed by the auxiliary load while the starter switch is off and an elapsed time from when the first operation is detected to when a second operation by the user is estimated to be detected.

3. The vehicle control apparatus according to claim 2, wherein the elapsed time is stored in advance in association with information about a position of the vehicle where the starter switch is turned off.

4. The vehicle control apparatus according to claim 1, wherein the electronic control unit is configured to, when the electronic control unit detects the first operation by the user and determines that the starter switch is off, drive the DC-DC converter such that, after a state of charge of the second battery, which is included in the acquired information on the charging status of the second battery, decreases to a second threshold, the DC-DC converter charges the second battery.

5. The vehicle control apparatus according to claim 1, wherein the electronic control unit is configured to, when the electronic control unit detects a third operation by the user, stop the DC-DC converter even when the amount of electric power charged in the second battery has not reached the target amount of charge.

6. The vehicle control apparatus according to claim 1, wherein the electronic control unit is configured to, when the electronic control unit stops the DC-DC converter, also stop a device that controls supply of electric power to the first battery and that uses the second battery as a power supply.

7. A vehicle comprising the vehicle control apparatus according to claim 1.

8. A control method that is executed by a computer of a vehicle control apparatus mounted on a vehicle including a DC-DC converter that supplies electric power from a first battery related to driving of the vehicle to a second battery, different from the first battery, and an auxiliary load that uses the second battery as a power supply, the control method comprising:
- determining a state of a starter switch of the vehicle;
- detecting an operation of a user to the vehicle;
- acquiring information on a charging status of the second battery;
- when a first operation by the user is detected and it is determined that the starter switch is off, driving the DC-DC converter such that the DC-DC converter charges the second battery;
- when an amount of electric power charged in the second battery, which is included in the acquired information on the charging status of the second battery, reaches a target amount of charge set based on an amount of electric power to be consumed by the auxiliary load while the starter switch is off, stopping the DC-DC converter; and
- when a state of charge of the second battery, which is included in the acquired information on the charging status of the second battery, becomes lower than or equal to a first threshold after the DC-DC converter is stopped, driving the DC-DC converter again such that the DC-DC converter supplies electric power to the auxiliary load while maintaining the state of charge of the second battery at the first threshold.

9. A non-transitory storage medium storing instructions executable on one or plurality of processors and causing the one or plurality of processors to execute functions, the non-transitory storage medium being included in a vehicle control apparatus mounted on a vehicle including a DC-DC converter that supplies electric power from a first battery related to driving of the vehicle to a second battery, different from the first battery, and an auxiliary load that uses the second battery as a power supply, the functions comprising:
- determining a state of a starter switch of the vehicle;
- detecting an operation of a user to the vehicle;
- acquiring information on a charging status of the second battery;
- when a first operation by the user is detected and it is determined that the starter switch is off, driving the DC-DC converter such that the DC-DC converter charges the second battery;
- when an amount of electric power charged in the second battery, which is included in the acquired information on the charging status of the second battery, reaches a target amount of charge set based on an amount of electric power to be consumed by the auxiliary load while the starter switch is off, stopping the DC-DC converter; and
- when a state of charge of the second battery, which is included in the acquired information on the charging status of the second battery, becomes lower than or equal to a first threshold after the DC-DC converter is stopped, driving the DC-DC converter again such that the DC-DC converter supplies electric power to the auxiliary load while maintaining the state of charge of the second battery at the first threshold.

* * * * *